United States Patent
Shang

(10) Patent No.: US 11,947,075 B2
(45) Date of Patent: Apr. 2, 2024

(54) CAMERA OPTICAL LENS

(71) Applicant: Changzhou Raytech Optronics Co., Ltd., Changzhou (CN)

(72) Inventor: Mingyang Shang, Shenzhen (CN)

(73) Assignee: Changzhou Raytech Optronics Co., Ltd., Changzhou (CN)

( * ) Notice: Subject to any disclaimer, the term of this patent is extended or adjusted under 35 U.S.C. 154(b) by 687 days.

(21) Appl. No.: 17/131,745

(22) Filed: Dec. 23, 2020

(65) Prior Publication Data

US 2022/0075144 A1    Mar. 10, 2022

(30) Foreign Application Priority Data

Sep. 8, 2020   (CN) .......................... 202010931554.9

(51) Int. Cl.
  *G02B 13/00*   (2006.01)
  *G02B 9/64*    (2006.01)

(52) U.S. Cl.
  CPC ........... *G02B 13/0045* (2013.01); *G02B 9/64* (2013.01)

(58) Field of Classification Search
  CPC ....... G02B 13/0045; G02B 9/64; G02B 13/06
  USPC ........................................................ 359/708
  See application file for complete search history.

(56) References Cited

U.S. PATENT DOCUMENTS

2020/0209594 A1* 7/2020 Hirano ............... G02B 13/0045
2020/0241243 A1* 7/2020 Hirano ..................... G02B 9/64
2022/0066148 A1* 3/2022 Zhao .................. G02B 13/0045

FOREIGN PATENT DOCUMENTS

CN          111381350 A  *  7/2020  ......... G02B 13/0045

* cited by examiner

*Primary Examiner* — Stephone B Allen
*Assistant Examiner* — Leonidas Boutsikaris
(74) *Attorney, Agent, or Firm* — W&G Law Group

(57) ABSTRACT

A camera optical lens is provided, including from an object side to an image side: a first lens; a second lens having negative refractive power; a third lens; a fourth lens; a fifth lens; a sixth lens; a seventh lens; an eighth lens; and a ninth lens, wherein the camera optical lens satisfies following conditions: $0.70 \leq f1/f \leq 1.80$; and $2.00 \leq d15/d16 \leq 10.00$, where f denotes a focal length of the camera optical lens; f1 denotes a focal length of the first lens; d15 denotes an on-axis thickness of the eighth lens; and d16 denotes an on-axis distance from an image side surface of the eighth lens to an object side surface of the ninth lens. The above camera optical lens can meet design requirements for large aperture, wide angle and ultra-thinness, while maintaining good imaging quality.

10 Claims, 9 Drawing Sheets

CAMERA OPTICAL LENS

TECHNICAL FIELD

The present invention relates to the technical field of optical lens and, in particular, to a camera optical lens suitable for handheld terminal devices such as smart phones or digital cameras, and imaging devices such as monitors or PC lenses.

BACKGROUND

With the emergence of smart phones in recent years, the demand for miniature camera lens is continuously increasing, but in general, the photosensitive devices of camera lens are nothing more than a Charge Coupled Device (CCD) or a Complementary Metal-Oxide Semiconductor Sensor (CMOS Sensor), and as progress of semiconductor manufacturing technology makes the pixel size of the photosensitive devices become smaller, in addition, a current development trend of electronic products requires better performance with thinner and smaller dimensions, miniature camera lenses with good imaging quality therefore have become a mainstream in the market.

In order to obtain better imaging quality, a camera lens traditionally equipped in a camera of a mobile phone generally constitutes three, four, even five or six lenses. However, with development of technology and increase in diversified requirements of users, a camera lens constituted by nine lenses gradually appears in camera design, in case that pixel area of the photosensitive device is continuously reduced and requirements on image quality is continuously increased. Although the common camera lens constituted by nine lenses has good optical performances, its configurations such as refractive power, lens spacing and lens shape still need to be optimized, therefore the camera lens cannot meet design requirements for some optical performances such as large aperture, ultra-thinness and wide angle while maintaining good imaging quality.

SUMMARY

In view of the above problems, the present invention provides a camera optical lens, which may meet design requirements on some optical performances such as large aperture, ultra-thinness and wide angle while maintaining good imaging quality.

Embodiments of the present invention provides a camera optical lens, including from an object side to an image side:
a first lens;
a second lens having negative refractive power;
a third lens;
a fourth lens;
a fifth lens;
a sixth lens;
a seventh lens;
an eighth lens; and
a ninth lens,
wherein the camera optical lens satisfies following conditions:

$$0.70 \leq f1/f \leq 1.80; \text{ and}$$

$$2.00 \leq d15/d16 \leq 10.00,$$

where
f denotes a focal length of the camera optical lens;
f1 denotes a focal length of the first lens;
d15 denotes an on-axis thickness of the eighth lens; and
d16 denotes an on-axis distance from an image side surface of the eighth lens to an object side surface of the ninth lens.

As an improvement, wherein the camera optical lens satisfies a following condition:

$$-10.00 \leq (R13+R14)/(R13-R14) \leq -6.00,$$

where
R13 denotes a central curvature radius of an object side surface of the seventh lens; and
R14 denotes a central curvature radius of an image side surface of the seventh lens.

As an improvement, wherein the camera optical lens satisfies following conditions:

$$-5.52 \leq (R1+R2)/(R1-R2) \leq -0.88; \text{ and}$$

$$0.04 \leq d1/TTL \leq 0.16,$$

where
R1 denotes a central curvature radius of an object side surface of the first lens;
R2 denotes a central curvature radius of an image side surface of the first lens;
d1 denotes an on-axis thickness of the first lens; and
TTL denotes a total optical length from the object side surface of the first lens to an image plane of the camera optical lens along an optic axis.

As an improvement, wherein the camera optical lens satisfies following conditions:

$$-4.36 \leq f2/f \leq -1.08;$$

$$1.58 \leq (R3+R4)/(R3-R4) \leq 7.30; \text{ and}$$

$$0.01 \leq d3/TTL \leq 0.04,$$

where
f2 denotes a focal length of the second lens;
R3 denotes a central curvature radius of an object side surface of the second lens;
R4 denotes a central curvature radius of an image side surface of the second lens;
d3 denotes an on-axis thickness of the second lens; and
TTL denotes a total optical length from an object side surface of the first lens to an image plane of the camera optical lens along an optic axis.

As an improvement, the camera optical lens satisfies following conditions:

$$0.78 \leq f3/f \leq 3.42;$$

$$-7.90 \leq (R5+R6)/(R5-R6) \leq -1.83; \text{ and}$$

$$0.03 \leq d5/TTL \leq 0.11,$$

where
f3 denotes a focal length of the third lens;
R5 denotes a central curvature radius of an object side surface of the third lens;
R6 denotes a central curvature radius of an image side surface of the third lens;
d5 denotes an on-axis thickness of the third lens; and
TTL denotes a total optical length from an object side surface of the first lens to an image plane of the camera optical lens along an optic axis.

As an improvement, wherein the camera optical lens satisfies following conditions:

$$-45.74 \leq f4/f \leq 5804.23;$$

$$-349.82 \leq (R7+R8)/(R7-R8) \leq 3.85; \text{ and}$$

$$0.07 \leq d7/TTL \leq 0.22,$$

where
f4 denotes a focal length of the fourth lens;
R7 denotes a central curvature radius of an object side surface of the fourth lens;
R8 denotes a central curvature radius of an image side surface of the fourth lens;
d7 denotes an on-axis thickness of the fourth lens; and
TTL denotes a total optical length from an object side surface of the first lens to an image plane of the camera optical lens along an optic axis.

As an improvement, wherein the camera optical lens satisfies following conditions:

$$1.61 \leq f5/f \leq 10.88;$$

$$-6.22 \leq (R9+R10)/(R9-R10) \leq -0.85; \text{ and}$$

$$0.03 \leq d9/TTL \leq 0.09,$$

where
f5 denotes a focal length of the fifth lens;
R9 denotes a central curvature radius of an object side surface of the fifth lens;
R10 denotes a central curvature radius of an image side surface of the fifth lens;
d9 denotes an on-axis thickness of the fifth lens; and
TTL denotes a total optical length from an object side surface of the first lens to an image plane of the camera optical lens along an optic axis.

As an improvement, wherein the camera optical lens satisfies following conditions:

$$-6.13 \leq f6/f \leq -1.68;$$

$$-6.58 \leq (R11+R12)/(R11-R12) \leq -1.61; \text{ and}$$

$$0.01 \leq d11/TTL \leq 0.05,$$

where
f6 denotes a focal length of the sixth lens;
R11 denotes a central curvature radius of an object side surface of the sixth lens;
R12 denotes a central curvature radius of an image side surface of the sixth lens;
d11 denotes an on-axis thickness of the sixth lens; and
TTL denotes a total optical length from an object side surface of the first lens to an image plane of the camera optical lens along an optic axis.

As an improvement, wherein the camera optical lens satisfies following conditions:

$$1.51 \leq f7/f \leq 7.66; \text{ and}$$

$$0.02 \leq d13/TTL \leq 0.08,$$

where
f7 denotes a focal length of the seventh lens;
d13 denotes an on-axis thickness of the seventh lens; and
TTL denotes a total optical length from an object side surface of the first lens to an image plane of the camera optical lens along an optic axis.

As an improvement, wherein the camera optical lens satisfies following conditions:

$$-20.76 \leq f8/f \leq 21.17;$$

$$-62.90 \leq (R15+R16)/(R15-R16) \leq 6.24; \text{ and}$$

$$0.06 \leq d15/TTL \leq 0.25,$$

where
f8 denotes a focal length of the eighth lens;
R15 denotes a central curvature radius of an object side surface of the eighth lens;
R16 denotes a central curvature radius of an image side surface of the eighth lens; and
TTL denotes a total optical length from an object side surface of the first lens to an image plane of the camera optical lens along an optic axis.

As an improvement, wherein the camera optical lens satisfies following conditions:

$$-5.32 \leq f9/f \leq -1.35;$$

$$2.53 \leq (R17+R18)/(R17-R18) \leq 10.69; \text{ and}$$

$$0.03 \leq d17/TTL \leq 0.10,$$

where
f9 denotes a focal length of the ninth lens;
R17 denotes a central curvature radius of an object side surface of the ninth lens;
R18 denotes a central curvature radius of an image side surface of the ninth lens;
d17 denotes an on-axis thickness of the ninth lens; and
TTL denotes a total optical length from an object side surface of the first lens to an image plane of the camera optical lens along an optic axis.

The present invention has following beneficial effects: the camera optical lens according to the present invention not only has excellent optical performances, but also has large aperture, wide angle, and ultra-thinness properties, which is especially suitable for mobile phone camera lens components composed of high-pixel CCD, CMOS and other imaging elements and WEB camera lens.

BRIEF DESCRIPTION OF DRAWINGS

Many aspects of the exemplary embodiments may be better understood with reference to following drawings. The components in the drawings are not necessarily drawn to scale, the emphasis instead being placed upon clearly illustrating the principles of the present invention. Moreover, in the drawings, like reference numerals designate corresponding parts throughout the several views.

DESCRIPTION OF EMBODIMENTS

In order to better illustrate the objectives, technical solutions and advantages of the present invention, the present invention will be described in further detail below with reference to the accompanying drawings and embodiments. It should be understood that the specific embodiments described herein are only used to explain the present invention but are not used to limit the present invention.

Embodiment 1

Figure 1:
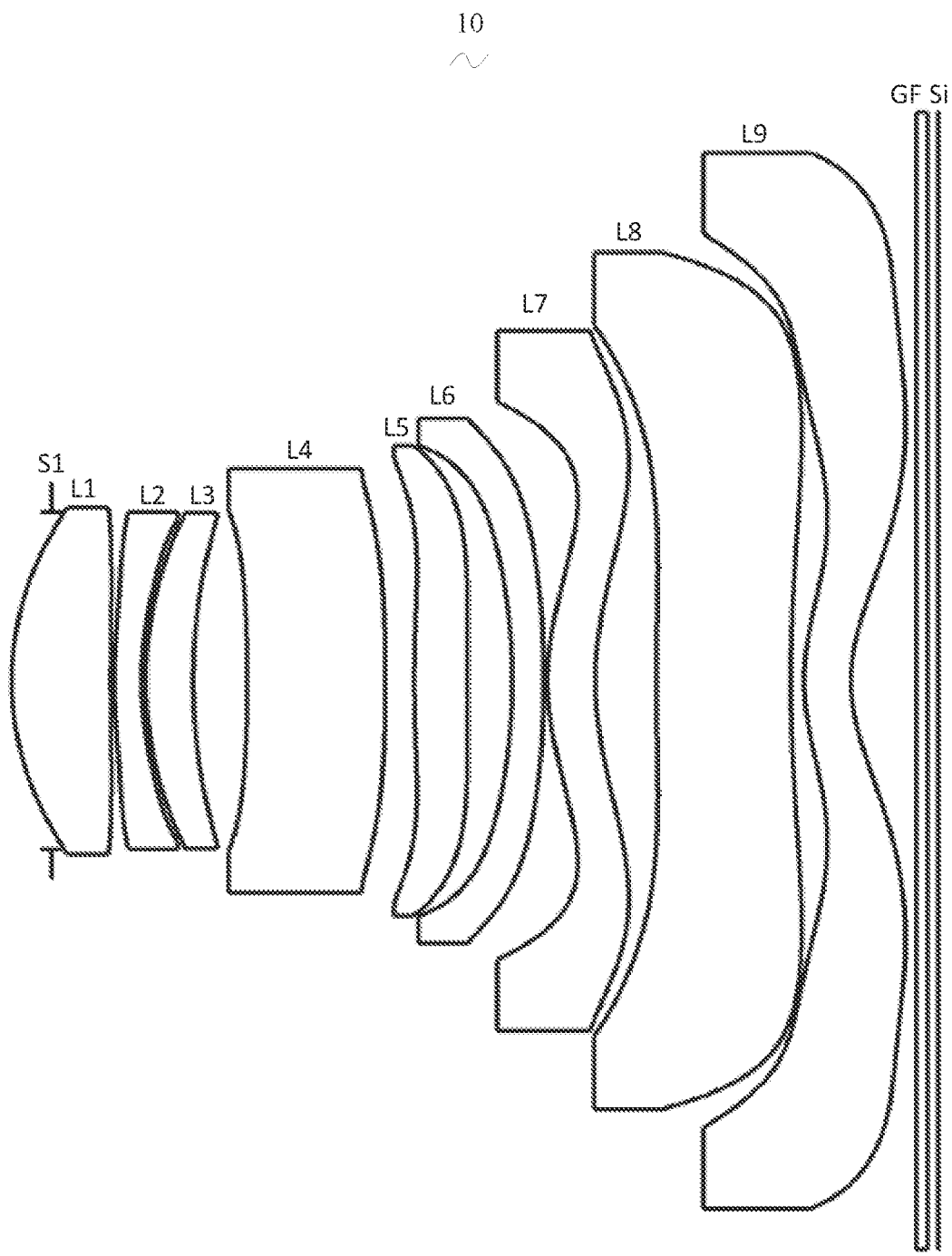
FIG. 1 is a structural schematic diagram of a camera optical lens according to Embodiment 1 of the present invention.

Referring to FIG. 1, the present invention provides a camera optical lens 10. FIG. 1 shows the camera optical lens 10 according to Embodiment 1 of the present invention. The camera optical lens 10 includes nine lenses. The camera optical lens 10 includes, from an object side to an image side, an aperture S1, a first lens L1, a second lens L2, a third lens L3, a fourth lens L4, a fifth lens L5, a sixth lens L6, a seventh lens L7, an eighth lens L8, and a ninth lens L9. An optical element such as an optical filter GF may be arranged between the ninth lens L9 and an image plane Si.

In this embodiment, the first lens L1 has positive refractive power, the second lens L2 has negative refractive power, the third lens L3 has positive refractive power, the fourth lens L4 has negative refractive power, the fifth lens L5 has positive refractive power, the sixth lens L6 has negative refractive power, the seventh lens L7 has positive refractive power, the eighth lens L8 has negative refractive power, and the ninth lens L9 has negative refractive power. It may be understood that, in other embodiments, the refractive power of the third lens L3, the fourth lens L4, the fifth lens L5, the sixth lens L6, the seventh lens L7, the eighth lens L8 and the ninth lens L9 may change.

In this embodiment, the first lens L1, the second lens L2, the third lens L3, the fourth lens L4, the fifth lens L5, the sixth lens L6, the seventh lens L7, the eighth lens L8, and the ninth lens L9 are each made of a plastic material. In other embodiments, the lenses may also be made of a material other than the plastic material.

In this embodiment, a focal length of the camera optical lens 10 is defined as f, and a focal length of the first lens L1 is defined as f1. The focal length f and the focal length f1 satisfy a following condition: $0.70 \leq f1/f \leq 1.80$, which specifies a ratio of the focal length of the first lens to a total focal length of the system. Within the range of the above condition, it is beneficial to correct system aberrations and improve imaging quality. Optionally, the focal length f and the focal length f1 satisfy a following condition: $0.83 \leq f1/f \leq 1.80$.

An on-axis thickness of the eighth lens L8 is defined as d15, an on-axis distance from an image side surface of the eighth lens L8 to an object side surface of the ninth lens L9 is defined as d16. The on-axis thickness d15 and the on-axis distance d16 satisfy a following condition: $2.00 \leq d15/d16 \leq 10.00$. Within the range of the above condition, it is beneficial to process lenses and assemble the camera lens. Optionally, the on-axis thickness d15 and the on-axis distance d16 satisfy a following condition: $2.05 \leq d15/d16 \leq 9.98$.

A central curvature radius of an object side surface of the seventh lens L7 is defined as R13, and a central curvature radius of an image side surface of the seventh lens L7 is defined as R14. The central curvature radius R13 and the central curvature radius R14 satisfy a following condition: $-10.00 \leq (R13+R14)/(R13-R14) \leq -6.00$, which specifies a shape of the seventh lens L7. Within the specified range of the condition, a degree of deflection of light passing through the lens may be alleviated, and aberrations may be effectively reduced. Optionally, The central curvature radius R13 and the central curvature radius R14 satisfy a following condition: $-9.83 \leq (R13+R14)/(R13-R14) \leq -6.02$.

In this embodiment, the object side surface of the first lens L1 is convex in a paraxial region, and the image side surface of the first lens L1 is concave in the paraxial region.

A central curvature radius of the object side surface of the first lens L1 is defined as R1, and a central curvature radius of the image side surface of the first lens L1 is defined as R2. The central curvature radius R1 and the central curvature radius R2 satisfy a following condition: $-5.52 \leq (R1+R2)/(R1-R2) \leq -0.88$. The shape of the first lens L1 is reasonably controlled so that the first lens L1 may effectively correct spherical aberration of the system. Optionally, the central curvature radius R1 and the central curvature radius R2 satisfy a following condition: $-3.45 \leq (R1+R2)/(R1-R2) \leq -1.09$.

An on-axis thickness of the first lens L1 is defined as d1, and a total optical length from the object side surface of the first lens L1 to the image plane Si of the camera optical lens 10 along an optic axis is defined as TTL. The on-axis thickness d1 and the total optical length TTL satisfy a following condition: $0.04 \leq d1/TTL \leq 0.16$. Within the range of the above condition, it is beneficial to achieve an ultra-thinness effect. Optionally, the on-axis thickness d1 and the total optical length TTL satisfy a following condition: $0.06 \leq d1/TTL \leq 0.13$.

In this embodiment, the object side surface of the second lens L2 is convex in a paraxial region, and the image side surface of the second lens L2 is concave in the paraxial region.

A focal length of the camera optical lens 10 is defined as f, and a focal length of the second lens L2 is defined as f2. The focal length f and the focal length f2 satisfy a following condition: $-4.36 \leq f2/f \leq -1.08$. The negative refractive power of the second lens L2 is controlled in the reasonable range, it is beneficial to correct aberration of the optical system. Optionally, the focal length f and the focal length f2 satisfy a following condition: $-2.72 \leq f2/f \leq -1.35$.

A central curvature radius of an object side surface of the second lens L2 is defined as R3, and a central curvature radius of an image side surface of the second lens L2 is defined as R4. The central curvature radius R3 and the central curvature radius R4 satisfy a following condition: $1.58 \leq (R3+R4)/(R3-R4) \leq 7.30$, which specifies a shape of the second lens L2. Within the range of the above condition, as the lens becomes ultra-thinness and wide angle, it is beneficial to correct on-axis chromatic aberration. Optionally, the central curvature radius R3 and the central curvature radius R4 satisfy a following condition: $2.53 \leq (R3+R4)/(R3-R4) \leq 5.84$.

An on-axis thickness of the second lens L2 is defined as d3, and a total optical length from the object side surface of the first lens L1 to the image plane Si of the camera optical lens 10 along an optic axis is defined as TTL. The on-axis thickness d3 and the total optical length TTL satisfy a following condition: 0.01≤d3/TTL≤0.04. Within the range of the above condition, it is beneficial to achieve an ultra-thinness effect. Optionally, the on-axis thickness d3 and the total optical length TTL satisfy a following condition: 0.02≤d3/TTL≤0.03.

In this embodiment, the object side surface of the third lens L3 is convex in a paraxial region, and the image side surface of the third lens L3 is concave in the paraxial region.

A focal length of the camera optical lens 10 is defined as f, and a focal length of the third lens L3 is defined as f3. The focal length f and the focal length f3 satisfy a following condition: 0.78≤f3/f≤3.42. With appropriate configuration of the refractive power, the system may obtain better imaging quality and lower sensitivity. Optionally, the focal length f and the focal length f3 satisfy a following condition: 1.25≤f3/f≤2.74.

A central curvature radius of an object side surface of the third lens L3 is defined as R5, and a central curvature radius of an image side surface of the third lens L3 is defined as R6. The central curvature radius R5 and the central curvature radius R6 satisfy a following condition: −7.90≤(R5+R6)/(R5−R6)≤−1.83, which specifies a shape of the third lens L3. Within the specified range of the condition, a degree of deflection of light passing through the lens may be alleviated, and aberrations may be effectively reduced. Optionally, the central curvature radius R5 and the central curvature radius R6 satisfy a following condition: −4.94≤(R5+R6)/(R5−R6)≤−2.28.

An on-axis thickness of the third lens L3 is defined as d5, and a total optical length from the object side surface of the first lens L1 to the image plane Si of the camera optical lens 10 along an optic axis is defined as TTL. The on-axis thickness d5 and the total optical length TTL satisfy a following condition: 0.03≤d5/TTL≤0.11. Within the range of the above condition, it is beneficial to achieve an ultra-thinness effect. Optionally, the on-axis thickness d5 and the total optical length TTL satisfy a following condition: 0.04≤d5/TTL≤0.09.

In this embodiment, the object side surface of the fourth lens L4 is concave in a paraxial region, and the image side surface of the fourth lens L4 is convex in the paraxial region.

A focal length of the camera optical lens 10 is defined as f, and a focal length of the fourth lens L4 is defined as f4. The focal length f and the focal length f4 satisfy a following condition: −45.74≤f4/f≤5804.23. With appropriate configuration of the refractive power, the system may obtain better imaging quality and lower sensitivity. Optionally, the focal length f and the focal length f4 satisfy a following condition: −28.59≤f4/f≤4643.38.

A central curvature radius of an object side surface of the fourth lens L4 is defined as R7, and a central curvature radius of an image side surface of the fourth lens L4 is defined as R8. The central curvature radius R7 and the central curvature radius R8 satisfy a following condition: −349.82≤(R7+R8)/(R7−R8)≤3.85, which specifies a shape of the fourth lens L4. Within the range of the above condition, it is beneficial to correct aberration of off-axis angle with the development of ultra-thinness and wide angle. Optionally, the central curvature radius R7 and the central curvature radius R8 satisfy a following condition: −218.64≤(R7+R8)/(R7−R8)≤3.08.

An on-axis thickness of the fourth lens L4 is defined as d7, and a total optical length from the object side surface of the first lens L1 to the image plane Si of the camera optical lens 10 along an optic axis is defined as TTL. The on-axis thickness d7 and the total optical length TTL satisfy a following condition: 0.07≤d7/TTL≤0.22. Within the range of the above condition, it is beneficial to achieve an ultra-thinness effect. Optionally, the on-axis thickness d7 and the total optical length TTL satisfy a following condition: 0.11≤d7/TTL≤0.18.

In this embodiment, the object side surface of the fifth lens L5 is convex in a paraxial region, and the image side surface of the fifth lens L5 is concave in the paraxial region.

A focal length of the camera optical lens 10 is defined as f, and a focal length of the fifth lens L5 is defined as f5. The focal length f and the focal length f5 satisfy a following condition: 1.61≤f5/f≤10.88. The limitation on the fifth lens L5 may effectively make the camera lens have a gentle light angle, thereby reducing tolerance sensitivity. Optionally, the focal length f and the focal length f5 satisfy a following condition: 2.58≤f5/f≤8.70.

A central curvature radius of an object side surface of the fifth lens is defined as R9, and a central curvature radius of an image side surface of the fifth lens is defined as R10. The central curvature radius R9 and the central curvature radius R10 satisfy a following condition: −6.22≤(R9+R10)/(R9−R10)≤−0.85, which specifies a shape of the fifth lens L5. Within the range of the above condition, it is beneficial to correct aberration of off-axis angle with the development of ultra-thinness and wide angle. Optionally, the central curvature radius R9 and the central curvature radius R10 satisfy a following condition: −3.89≤(R9+R10)/(R9−R10)≤−1.06.

An on-axis thickness of the fifth lens L5 is defined as d9, and a total optical length from the object side surface of the first lens L1 to the image plane Si of the camera optical lens 10 along an optic axis is defined as TTL. The on-axis thickness d9 and the total optical length TTL satisfy a following condition: 0.03≤d9/TTL≤0.09. Within the range of the condition, it is beneficial to achieve an ultra-thinness effect. Optionally, the on-axis thickness d9 and the total optical length TTL satisfy a following condition: 0.04≤d9/TTL≤0.07.

In this embodiment, the object side surface of the sixth lens L6 is concave in a paraxial region, and the image side surface of the sixth lens L6 is convex in the paraxial region.

A focal length of the camera optical lens 10 is defined as f, and a focal length of the sixth lens L6 is defined as f6. The focal length f and the focal length f6 satisfy a following condition: −6.13≤f6/f≤−1.68. With appropriate configuration of the refractive power, the system may obtain better imaging quality and lower sensitivity. Optionally, the focal length f and the focal length f6 satisfy a following condition: −3.83≤f6/f≤−2.10.

A central curvature radius of an object side surface of the sixth lens L6 is defined as R11, and a central curvature radius of an image side surface of the sixth lens is defined as R12. The central curvature radius R11 and the central curvature radius R12 satisfy a following condition: −6.58≤(R11+R12)/(R11−R12)≤−1.61, which specifies a shape of the sixth lens L6. Within the range of the above condition, it is beneficial to correct aberration of off-axis angle with the development of ultra-thinness and wide angle. Optionally, the central curvature radius R11 and the central curvature radius R12 satisfy a following condition: −4.12≤(R11+R12)/(R11−R12)≤−2.02.

An on-axis thickness of the sixth lens L6 is defined as d11, and a total optical length from the object side surface of the first lens L1 to the image plane Si of the camera optical lens 10 along an optic axis is defined as TTL. The on-axis thickness d11 and the total optical length TTL satisfy a following condition: 0.01≤d11/TTL≤0.05. Within the range of the condition, it is beneficial to achieve an ultra-thinness effect. Optionally, the on-axis thickness d11 and the total optical length TTL satisfy a following condition: 0.02≤d11/TTL≤0.04.

In this embodiment, the object side surface of the seventh lens L7 is convex in a paraxial region, and the image side surface of the seventh lens L7 is concave in the paraxial region.

A focal length of the camera optical lens 10 is defined as f, and a focal length of the seventh lens L7 is defined as P. The focal length f and the focal length P satisfy a following condition: 1.51≤f7/f≤7.66. With appropriate configuration of the refractive power, the system may obtain better imaging quality and lower sensitivity. Optionally, the focal length f and the focal length P satisfy a following condition: 2.42≤f7/f≤6.13.

An on-axis thickness of the seventh lens L7 is defined as d13, and a total optical length from the object side surface of the first lens L1 to the image plane Si of the camera optical lens 10 along an optic axis is defined as TTL. The on-axis thickness d13 and the total optical length TTL satisfy a following condition: 0.02≤d13/TTL≤0.08. Within the range of the condition, it is beneficial to achieve an ultra-thinness effect. Optionally, the on-axis thickness d13 and the total optical length TTL satisfy a following condition: 0.04≤d13/TTL≤0.06.

In this embodiment, the object side surface of the eighth lens L8 is convex in a paraxial region, and the image side surface of the eighth lens L8 is concave in the paraxial region.

The focal length of the camera optical lens 10 is defined as f, and a focal length of the eighth lens L8 is defined as f8. The focal length f and the focal length f8 satisfy a following condition: −20.76≤f8/≤21.17. With appropriate configuration of the refractive power, the system may obtain better imaging quality and lower sensitivity. Optionally, the focal length f and the focal length f8 satisfy a following condition: −12.97≤f8/f≤16.94.

A central curvature radius of an object side surface of the eighth lens L8 is defined as R15, and a central curvature radius of an image side surface of the eighth lens L8 is defined as R16. The central curvature radius R15 and the central curvature radius R16 satisfy a following condition: −62.90≤(R15+R16)/(R15−R16)≤6.24, which specifies a shape of the eighth lens. Within the range of the above condition, it is beneficial to correct aberration of off-axis angle with the development of ultra-thinness and wide angle. Optionally, the central curvature radius R15 and the central curvature radius R16 satisfy a following condition: −39.31≤(R15+R16)/(R15−R16)≤4.99.

An on-axis thickness of the eighth lens L8 is defined as d15, and a total optical length from the object side surface of the first lens L1 to the image plane Si of the camera optical lens 10 along an optic axis is defined as TTL. The on-axis thickness d15 and the total optical length TTL satisfy a following condition: 0.06≤d15/TTL≤0.25. Within the range of the above condition, it is beneficial to achieve an ultra-thinness effect. Optionally, the on-axis thickness d15 and the total optical length TTL satisfy a following condition: 0.10≤d15/TTL≤0.20.

In this embodiment, the object side surface of the ninth lens L9 is convex in a paraxial region, and the image side surface of the ninth lens L9 is concave in the paraxial region.

The focal length of the camera optical lens 10 is defined as f, and a focal length of the ninth lens L9 is defined as f9. The focal length f and the focal length f9 satisfy a following condition: −5.32≤f9/f≤−1.35. With appropriate configuration of the refractive power, the system may obtain better imaging quality and lower sensitivity. Optionally, the focal length f and the focal length f9 satisfy a following condition: −3.32≤f9/f≤−1.68.

A central curvature radius of an object side surface of the ninth lens L9 is defined as R17, and a central curvature radius of an image side surface of the ninth lens L9 is defined as R18. The central curvature radius R17 and the central curvature radius R18 satisfy a following condition: 2.53≤(R17+R18)/(R17−R18)≤10.69, which specifies a shape of the ninth lens. Within the range of the above condition, it is beneficial to correct aberration of off-axis angle with the development of ultra-thinness and wide angle. Optionally, the central curvature radius R17 and the central curvature radius R18 satisfy a following condition: 4.04≤(R17+R18)/(R17−R18)≤8.55.

An on-axis thickness of the ninth lens L9 is defined as d17, and a total optical length from the object side surface of the first lens L1 to the image plane Si of the camera optical lens 10 along an optic axis is defined as TTL. The on-axis thickness d17 and the total optical length TTL satisfy a following condition: 0.03≤d17/TTL≤0.10. Within the range of the condition, it is beneficial to achieve an ultra-thinness effect. Optionally, the on-axis thickness d17 and the total optical length TTL satisfy a following condition: 0.04≤d17/TTL≤0.08.

In this embodiment, an image height of the camera optical lens 10 is IH, and a total optical length from the object side surface of the first lens L1 to the image plane Si of the camera optical lens 10 along an optic axis is defined as TTL. The image height IH and the total optical length TTL satisfy a following condition: TTL/IH≤1.55. Within the range of the condition, it is beneficial to achieve an ultra-thinness effect.

In this embodiment, a field of view FOV of the camera optical lens 10 is greater than or equal to 71.50°, so that a wide angle effect is achieved, thereby obtaining a good imaging quality of the camera optical lens.

In this embodiment, an F number FNO of the camera optical lens 10 is less than or equal to 2.01, so that a large aperture is achieved, thereby obtaining a good imaging quality of the camera optical lens.

When the above conditions are satisfied, the camera optical lens 10 may meet the design requirements for large aperture, wide angle and ultra-thinness while maintaining good optical performances. According to properties of the camera optical lens 10, the camera optical lens 10 is especially suitable for mobile phone camera lens components composed of high-pixel CCD, CMOS and other imaging elements and WEB camera lens.

The camera optical lens 10 of the present invention will be described below with examples. The symbols recorded in each example will be described as follows. The focal length, on-axis distance, central curvature radius, on-axis thickness, inflection point position, and arrest point position are each in unit of millimeter (mm).

TTL denotes a total optical length (on-axis distance from the object side surface of the first lens L1 to the image plane Si), with a unit of millimeter (mm).

F number FNO denotes a ratio of an effective focal length of the camera optical lens to an entrance pupil diameter.

Optionally, the object side surface and/or the image side surface of the lens may be provided with inflection points and/or arrest points in order to meet high-quality imaging requirements. The description below may be referred to in specific embodiments as follows.

Design data of the camera optical lens 10 according to Embodiment 1 of the present invention are shown in Tables 1 and 2.

TABLE 1

|  | R | d | nd | | vd | |
|---|---|---|---|---|---|---|
| S1 | ∞ | d0 = −0.390 | | | | |
| R1 | 3.261 | d1 = 0.980 | nd1 | 1.5444 | v1 | 55.82 |
| R2 | 24.104 | d2 = 0.041 | | | | |
| R3 | 6.674 | d3 = 0.264 | nd2 | 1.6400 | v2 | 23.54 |
| R4 | 3.465 | d4 = 0.046 | | | | |
| R5 | 3.806 | d5 = 0.470 | nd3 | 1.5444 | v3 | 55.82 |
| R6 | 6.386 | d6 = 0.540 | | | | |
| R7 | −18.865 | d7 = 1.369 | nd4 | 1.5444 | v4 | 55.82 |
| R8 | −24.569 | d8 = 0.288 | | | | |
| R9 | 13.896 | d9 = 0.527 | nd5 | 1.5444 | v5 | 55.82 |
| R10 | 27.078 | d10 = 0.448 | | | | |
| R11 | −6.412 | d11 = 0.311 | nd6 | 1.6400 | v6 | 23.54 |
| R12 | −12.006 | d12 = 0.036 | | | | |
| R13 | 2.878 | d13 = 0.476 | nd7 | 1.5444 | v7 | 55.82 |
| R14 | 3.589 | d14 = 0.606 | | | | |
| R15 | 24.240 | d15 = 1.334 | nd8 | 1.5444 | v8 | 55.82 |
| R16 | 14.840 | d16 = 0.134 | | | | |
| R17 | 2.406 | d17 = 0.464 | nd9 | 1.5346 | v9 | 55.69 |
| R18 | 1.814 | d18 = 0.650 | | | | |
| R19 | ∞ | d19 = 0.110 | ndg | 1.5168 | vg | 64.17 |
| R20 | ∞ | d20 = 0.107 | | | | |

The reference signs are explained as follows.
S1: aperture;
R: central curvature radius of an optical surface;
R1: central curvature radius of the object side surface of the first lens L1;
R2: central curvature radius of the image side surface of the first lens L1;
R3: central curvature radius of the object side surface of the second lens L2;
R4: central curvature radius of the image side surface of the second lens L2;
R5: central curvature radius of the object side surface of the third lens L3;
R6: central curvature radius of the image side surface of the third lens L3;
R7: central curvature radius of the object side surface of the fourth lens L4;
R8: central curvature radius of the image side surface of the fourth lens L4;
R9: central curvature radius of the object side surface of the fifth lens L5;
R10: central curvature radius of the image side surface of the fifth lens L5;
R11: central curvature radius of the object side surface of the sixth lens L6;
R12: central curvature radius of the image side surface of the sixth lens L6;
R13: central curvature radius of the object side surface of the seventh lens L7;
R14: central curvature radius of the image side surface of the seventh lens L7;
R15: central curvature radius of the object side surface of the eighth lens L8;
R16: central curvature radius of the image side surface of the eighth lens L8;
R17: central curvature radius of the object side surface of the ninth lens L9;
R18: central curvature radius of the image side surface of the ninth lens L9;
R19: central curvature radius of the object side surface of the optical filter GF;
R20: central curvature radius of the image side surface of the optical filter GF;
d: on-axis thickness of a lens and an on-axis distance between lenses;
d0: on-axis distance from the aperture S1 to the object side surface of the first lens L1;
d1: on-axis thickness of the first lens L1;
d2: on-axis distance from the image side surface of the first lens L1 to the object side surface of the second lens L2;
d3: on-axis thickness of the second lens L2;
d4: on-axis distance from the image side surface of the second lens L2 to the object side surface of the third lens L3;
d5: on-axis thickness of the third lens L3;
d6: on-axis distance from the image side surface of the third lens L3 to the object side surface of the fourth lens L4;
d7: on-axis thickness of the fourth lens L4;
d8: on-axis distance from the image side surface of the fourth lens L4 to the object side surface of the fifth lens L5;
d9: on-axis thickness of the fifth lens L5;
d10: on-axis distance from the image side surface of the fifth lens L5 to the object side surface of the sixth lens L6;
d11: on-axis thickness of the sixth lens L6;
d12: on-axis distance from the image side surface of the sixth lens L6 to the object side surface of the seventh lens L7;
d13: on-axis thickness of the seventh lens L7;
d14: on-axis distance from the image side surface of the seventh lens L7 to the object side surface of the eighth lens L8;
d15: on-axis thickness of the eighth lens L8;
d16: on-axis distance from the image side surface of the eighth lens L8 to the object side surface of the ninth lens L9;
d17: on-axis thickness of the ninth lens L9;
d18: on-axis distance from the image side surface of the ninth lens L9 to the object side surface of the optical filter GF;
d19: on-axis thickness of the optical filter GF;
d20: on-axis distance from the image side surface of the optical filter GF to the image plane Si;
nd: refractive index of a d-line;
nd1: refractive index of the d-line of the first lens L1;
nd2: refractive index of the d-line of the second lens L2;
nd3: refractive index of the d-line of the third lens L3;
nd4: refractive index of the d-line of the fourth lens L4;
nd5: refractive index of the d-line of the fifth lens L5;
nd6: refractive index of the d-line of the sixth lens L6;
nd7: refractive index of the d-line of the seventh lens L7;
nd8: refractive index of the d-line of the eighth lens L8;
nd9: refractive index of the d-line of the ninth lens L9;
ndg: refractive index of the d-line of the optical filter GF;
vd: Abbe number;
v1: Abbe number of the first lens L1;
v2: Abbe number of the second lens L2;
v3: Abbe number of the third lens L3;
v4: Abbe number of the fourth lens L4;
v5: Abbe number of the fifth lens L5;

v6: Abbe number of the sixth lens L6;
v7: Abbe number of the seventh lens L7;
v8: Abbe number of the eighth lens L8;
v9: Abbe number of the ninth lens L9;
vg: Abbe number of the optical filter GF.

Table 2 shows aspherical surface data of each lens in the camera optical lens 10 according to Embodiment 1 of the present invention.

Design data of the inflection point and the arrest point of each lens in the camera optical lens 10 according to Embodiment 1 of the present invention are shown in Tables 3 and 4. Here, P1R1 and P1R2 denote the object side surface and image side surface of the first lens L1, respectively. P2R1 and P2R2 denote the object side surface and image side surface of the second lens L2, respectively. P3R1 and P3R2 denote the object side surface and image side surface of the

TABLE 2

| | Conic coefficient | Aspherical surface coefficient | | | | |
|---|---|---|---|---|---|---|
| | k | A4 | A6 | A8 | A10 | A12 |
| R1 | 1.2636E−01 | 1.2543E−03 | −9.1743E−04 | 4.3744E−04 | −1.4996E−04 | 9.3345E−06 |
| R2 | 2.3921E+01 | −1.8860E−02 | 8.7865E−03 | −2.9424E−03 | 5.6053E−04 | −6.0057E−05 |
| R3 | −1.9165E+01 | −2.8802E−02 | 1.2544E−02 | −2.8740E−03 | 5.1324E−04 | −5.4371E−05 |
| R4 | −1.4012E+01 | 3.9517E−03 | −1.3452E−03 | 2.2944E−03 | −9.1893E−04 | 1.8696E−04 |
| R5 | −1.8858E+01 | 2.1654E−02 | −4.8635E−03 | 9.2773E−04 | −9.9225E−05 | −1.0788E−05 |
| R6 | 9.3508E+00 | −5.6050E−03 | 1.6534E−03 | −7.3889E−04 | −1.3680E−06 | −1.2580E−05 |
| R7 | −1.3005E+02 | −9.1895E−03 | −7.3985E−04 | 4.7084E−04 | −1.8214E−04 | 4.4759E−06 |
| R8 | −5.3242E+02 | −1.1823E−02 | 5.8399E−04 | −8.4888E−05 | 2.0613E−05 | 2.9153E−06 |
| R9 | −2.1443E+02 | −3.8845E−03 | −2.3797E−03 | 7.1099E−05 | 2.5771E−05 | 2.6102E−07 |
| R10 | −1.7551E+03 | −1.4674E−02 | 3.2036E−03 | −8.2109E−04 | −1.7471E−04 | 1.0436E−04 |
| R11 | 4.3673E+00 | −1.3793E−03 | 5.7697E−03 | −2.7980E−03 | 5.4713E−04 | −5.5538E−05 |
| R12 | 1.3659E+01 | −9.5617E−03 | 5.4796E−03 | −1.9221E−03 | 3.1724E−04 | −2.6951E−05 |
| R13 | −4.6248E+00 | −1.5497E−02 | 1.7602E−03 | −5.3194E−04 | 6.6444E−05 | −6.1584E−06 |
| R14 | −4.1555E+00 | −1.0891E−02 | 8.5204E−04 | −1.5919E−04 | 1.5210E−05 | −5.9725E−07 |
| R15 | −4.1555E+00 | −8.8309E−03 | 1.0465E−03 | −1.5988E−04 | 1.4635E−05 | −6.2487E−07 |
| R16 | −4.1555E+00 | −4.3747E−03 | 9.1565E−04 | −1.6668E−04 | 1.4733E−05 | −6.1428E−07 |
| R17 | −4.7278E+00 | −3.7245E−02 | 4.9091E−03 | −3.6427E−04 | 1.9344E−05 | −7.6546E−07 |
| R18 | −3.6290E+00 | −2.6346E−02 | 4.2428E−03 | −4.6519E−04 | 3.2941E−05 | −1.3968E−06 |

| | Conic coefficient | Aspherical surface coefficient | | | |
|---|---|---|---|---|---|
| | k | A14 | A16 | A18 | A20 |
| R1 | 1.2636E−01 | −8.0543E−08 | 5.4548E−08 | −9.0555E−08 | −4.4422E−09 |
| R2 | 2.3921E+01 | −1.4803E−06 | 6.7034E−07 | 3.5990E−07 | −1.0239E−07 |
| R3 | −1.9165E+01 | 6.5809E−06 | 1.0465E−07 | 3.1539E−07 | −1.3475E−07 |
| R4 | −1.4012E+01 | 1.6398E−05 | −2.9021E−06 | −7.3381E−07 | −3.3269E−08 |
| R5 | −1.8858E+01 | 9.3903E−06 | 1.6956E−06 | 3.0245E−07 | −2.1798E−07 |
| R6 | 9.3508E+00 | −3.6869E−06 | 1.8857E−06 | 1.8377E−07 | −1.4992E−07 |
| R7 | −1.3005E+02 | 7.9648E−06 | −3.4677E−07 | −4.1533E−07 | 1.6668E−08 |
| R8 | −5.3242E+02 | 1.1645E−08 | −9.1950E−08 | 7.6719E−09 | 1.4864E−09 |
| R9 | −2.1443E+02 | 3.4939E−09 | −1.6396E−08 | 9.8368E−10 | 6.4949E−10 |
| R10 | −1.7551E+03 | −1.6182E−05 | 8.0079E−07 | 8.1986E−10 | 3.7362E−10 |
| R11 | 4.3673E+00 | 2.4847E−06 | −1.9988E−06 | −2.9919E−09 | −1.7476E−09 |
| R12 | 1.3659E+01 | 8.9036E−07 | −4.3436E−09 | 5.5606E−10 | 1.3295E−10 |
| R13 | −4.6248E+00 | 2.0979E−07 | 3.3287E−09 | 2.0502E−10 | 3.6196E−12 |
| R14 | −4.1555E+00 | 7.9906E−09 | 8.2046E−11 | −9.1024E−13 | −1.4198E−13 |
| R15 | −4.1555E+00 | 7.2168E−09 | 8.5910E−11 | 2.0501E−12 | 3.8301E−14 |
| R16 | −4.1555E+00 | 7.6242E−09 | 9.4536E−11 | 4.6762E−13 | −8.8506E−14 |
| R17 | −4.7278E+00 | 1.8388E−08 | −2.0523E−10 | 2.8922E−13 | 1.4949E−14 |
| R18 | −3.6290E+00 | 3.2514E−08 | −3.2873E−10 | −3.0890E−13 | 1.9426E−14 |

Here, k denotes a conic coefficient, and A4, A6, A8, A10, A12, A14, A16, A18, and A20 denote an aspherical coefficient, respectively.

$$y=(x^2/R)/\{1+[1-(k+1)(x^2/R^2)]^{1/2}\}+A4x^4+A6x^6+A8x^8+A10x^{10}+A12x^{12}+A14x^{14}+A16x^{16}+A18x^{18}+A20x^{20} \quad (1)$$

Here, x denotes a vertical distance between a point on an aspherical curve and the optical axis, and y denotes a depth of the aspherical surface, i.e., a vertical distance between a point on the aspherical surface having a distance x from the optical axis and a tangent plane tangent to a vertex on an aspherical optical axis.

For convenience, the aspherical surface of each lens surface uses the aspherical surface shown in the above formula (1). However, the present invention is not limited to the aspherical polynomial form shown in the formula (1).

third lens L3, respectively. P4R1 and P4R2 denote the object side surface and image side surface of the fourth lens L4, respectively. P5R1 and P5R2 denote the object side surface and image side surface of the fifth lens L5, respectively. P6R1 and P6R2 denote the object side surface and image side surface of the sixth lens L6, respectively. P7R1 and P7R2 denote the object side surface and image side surface of the seventh lens L7, respectively. P8R1 and P8R2 denote the object side surface and image side surface of the eighth lens L8, respectively. P9R1 and P9R2 denote the object side surface and image side surface of the ninth lens L9, respectively. Data in an "inflection point position" column are a vertical distance from an inflexion point provided on a surface of each lens to the optical axis of the camera optical lens 10. Data in an "arrest point position" column are a vertical distance from an arrest point provided on the surface of each lens to the optical axis of the camera optical lens 10.

TABLE 3

| | Number of inflexion points | Inflexion point position 1 | Inflexion point position 2 | Inflexion point position 3 | Inflexion point position 4 |
|---|---|---|---|---|---|
| P1R1 | 1 | 1.745 | / | / | / |
| P1R2 | 1 | 0.505 | / | / | / |
| P2R1 | 2 | 0.845 | 1.005 | / | / |
| P2R2 | 0 | / | / | / | / |
| P3R1 | 0 | / | / | / | / |
| P3R2 | 1 | 1.605 | / | / | / |
| P4R1 | 0 | / | / | / | / |
| P4R2 | 1 | 1.905 | / | / | / |
| P5R1 | 2 | 0.695 | 2.175 | / | / |
| P5R2 | 1 | 0.385 | / | / | / |
| P6R1 | 0 | / | / | / | / |
| P6R2 | 1 | 2.675 | / | / | / |
| P7R1 | 1 | 1.095 | / | / | / |
| P7R2 | 2 | 1.265 | 3.355 | / | / |
| P8R1 | 1 | 0.665 | / | / | / |
| P8R2 | 1 | 1.625 | / | / | / |
| P9R1 | 4 | 0.825 | 2.745 | 3.305 | 4.725 |
| P9R2 | 3 | 1.035 | 3.565 | 3.995 | / |

TABLE 4

| | Number of arrest points | Arrest point position 1 |
|---|---|---|
| P1R1 | 0 | / |
| P1R2 | 1 | 1.025 |
| P2R1 | 0 | / |
| P2R2 | 0 | / |
| P3R1 | 0 | / |
| P3R2 | 0 | / |
| P4R1 | 0 | / |
| P4R2 | 0 | / |
| P5R1 | 1 | 1.165 |
| P5R2 | 1 | 0.705 |
| P6R1 | 0 | / |
| P6R2 | 0 | / |
| P7R1 | 1 | 1.915 |
| P7R2 | 1 | 2.295 |
| P8R1 | 1 | 1.205 |
| P8R2 | 1 | 2.595 |
| P9R1 | 1 | 1.715 |
| P9R2 | 1 | 2.725 |

Figure 2:
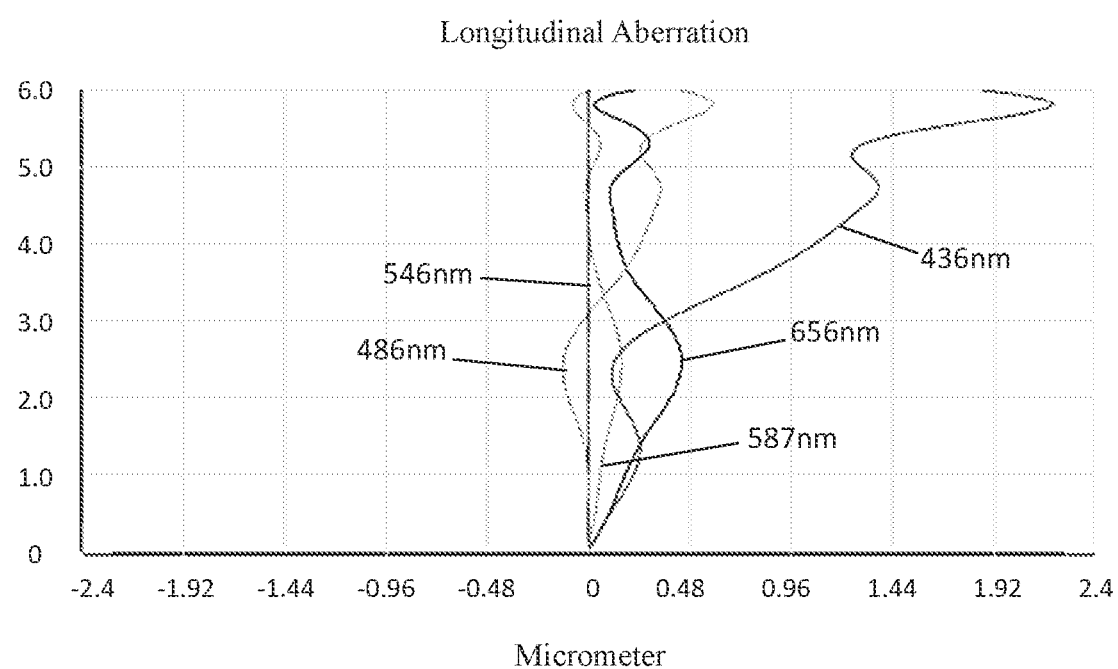
FIG. 2 is a schematic diagram of a longitudinal aberration of the camera optical lens shown in FIG. 1.
Figure 3:
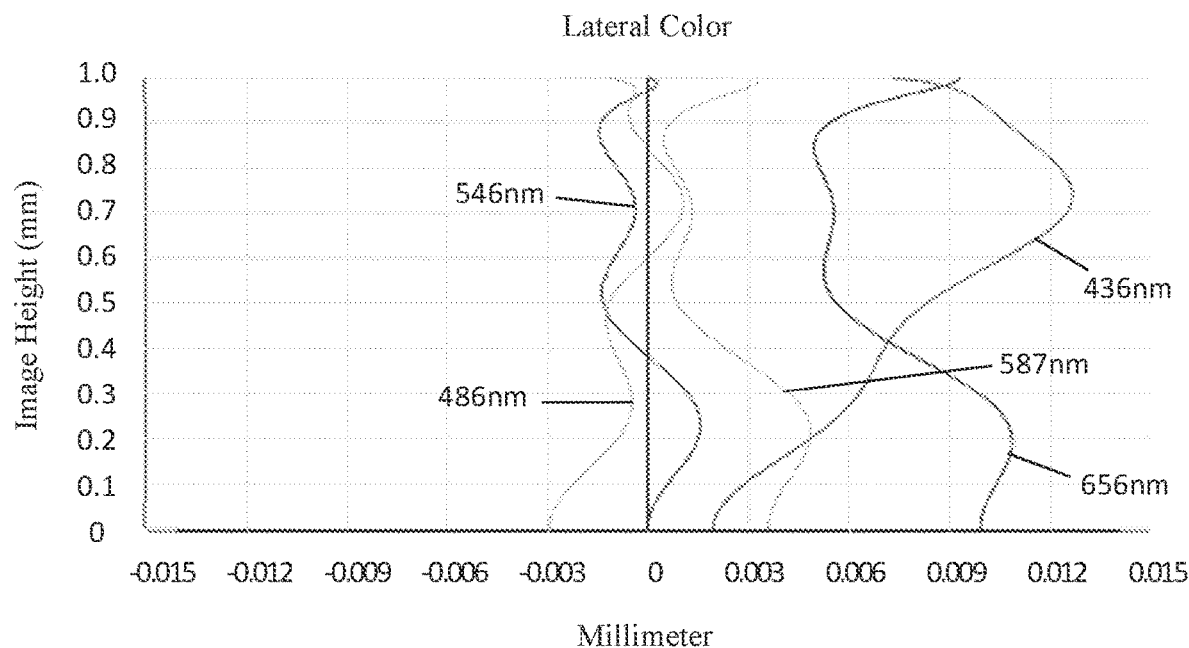
FIG. 3 is a schematic diagram of a lateral color of the camera optical lens shown in FIG. 1.
Figure 4:
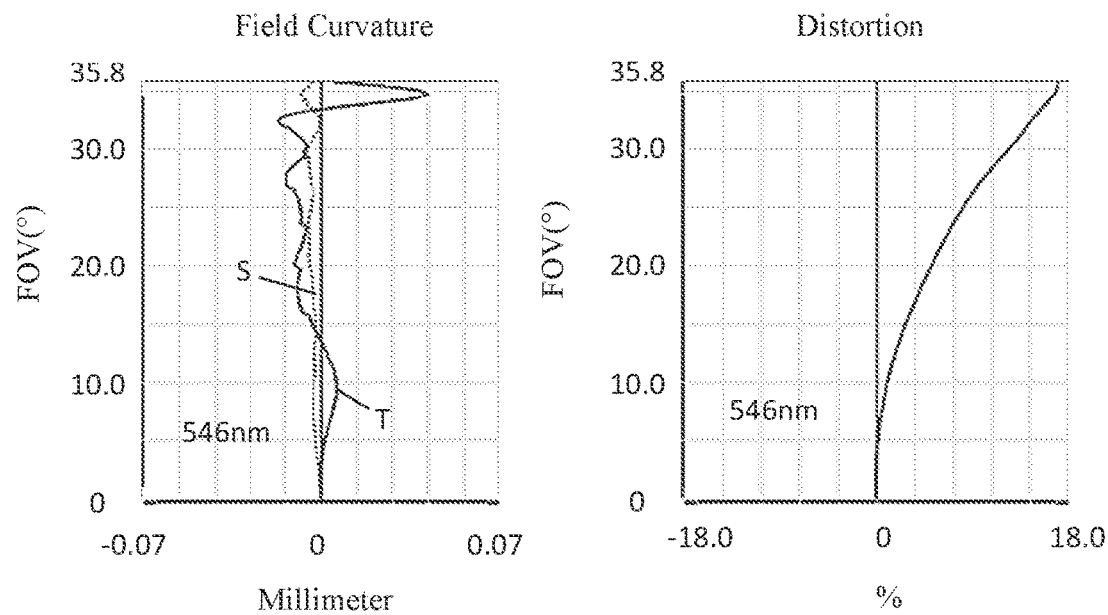
FIG. 4 is a schematic diagram of a field curvature and a distortion of the camera optical lens shown in FIG. 1.

FIG. 2 and FIG. 3 are schematic diagrams of a longitudinal aberration and a lateral color of the camera optical lens 10 after light having a wavelength of 656 nm, 587 nm, 546 nm, 486 nm, and 436 nm passes through the camera optical lens 10 according to Embodiment 1, respectively. FIG. 4 is a schematic diagram of a field curvature and a distortion of the camera optical lens 10 after light having a wavelength of 546 nm passes through the camera optical lens 10 according to Embodiment 1. A field curvature S in FIG. 4 is a field curvature in a sagittal direction, and T is a field curvature in a meridian direction.

Table 13 below shows numerical values corresponding to various numerical values in Embodiments 1, 2, and 3 and parameters specified in the conditions.

As shown in Table 13, Embodiment 1 satisfies various conditions.

In this embodiment, the entrance pupil diameter ENPD of the camera optical lens 10 is 3.551 mm, a full-field image height IH is 6.000 mm, and a field of view FOV in a diagonal direction is 71.60°. The camera optical lens 10 satisfies design requirements for large aperture, wide angle and ultra-thinness. The on-axis and off-axis chromatic aberrations are fully corrected, thereby achieving excellent optical performances.

Embodiment 2

Embodiment 2 is basically the same as Embodiment 1, and involves symbols having the same meanings as Embodiment 1, and only differences therebetween are listed below.

Figure 5:
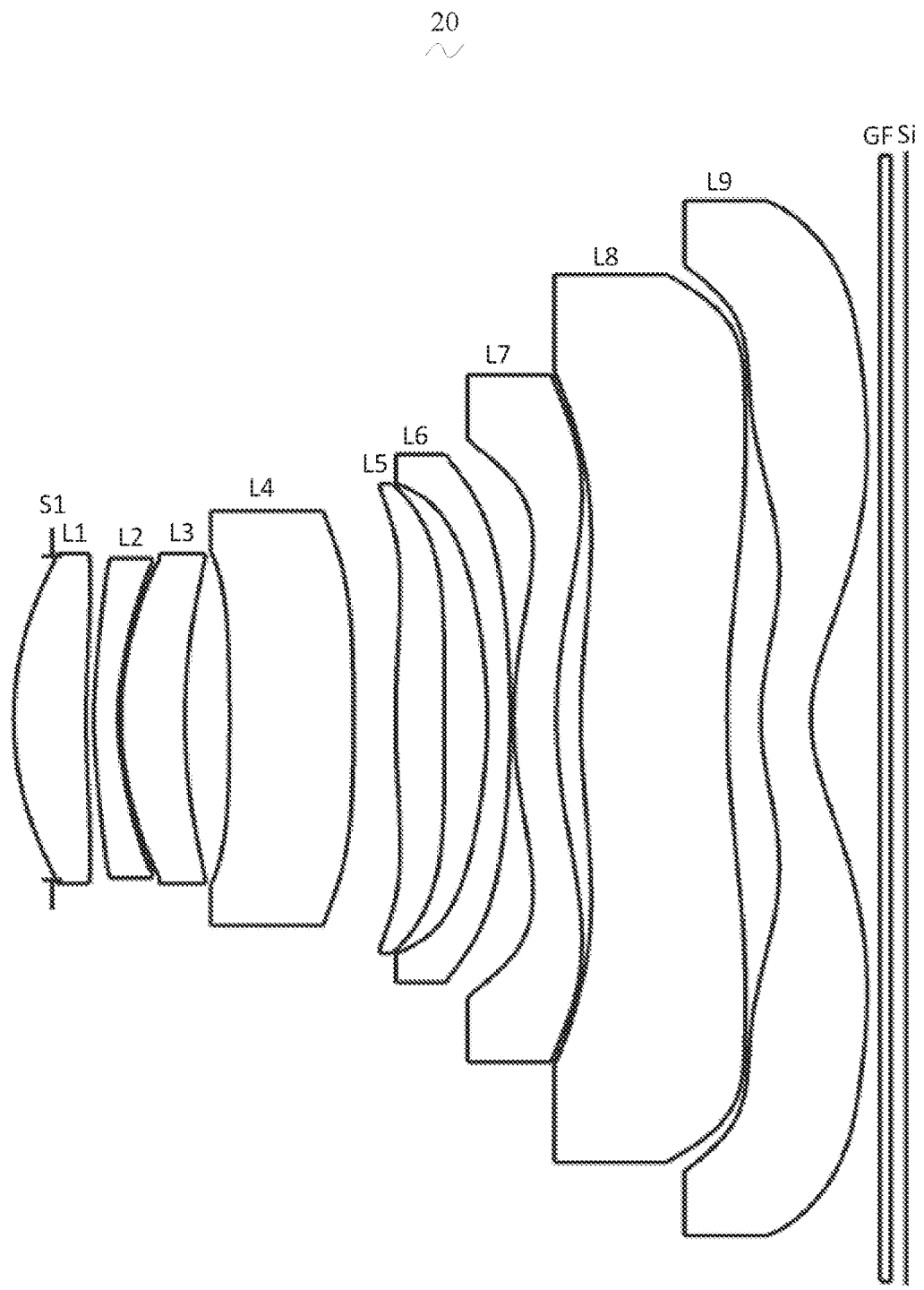
FIG. 5 is a structural schematic diagram of a camera optical lens according to Embodiment 2 of the present invention.

FIG. 5 shows a camera optical lens 20 according to Embodiment 2 of the present invention. The fourth lens L4 has positive refractive power, and the eighth lens L8 has positive refractive power.

Design data of the camera optical lens 20 according to Embodiment 2 of the present invention are shown in Tables 5 and 6.

TABLE 5

| | R | d | | nd | | vd |
|---|---|---|---|---|---|---|
| S1 | ∞ | d0 = | −0.390 | | | |
| R1 | 3.499 | d1 = | 0.738 | nd1 | 1.5444 | v1 | 55.82 |
| R2 | 10.444 | d2 = | 0.077 | | | |
| R3 | 4.871 | d3 = | 0.249 | nd2 | 1.6400 | v2 | 23.54 |
| R4 | 2.998 | d4 = | 0.029 | | | |
| R5 | 3.313 | d5 = | 0.652 | nd3 | 1.5444 | v3 | 55.82 |
| R6 | 6.702 | d6 = | 0.455 | | | |
| R7 | −32.521 | d7 = | 1.266 | nd4 | 1.5444 | v4 | 55.82 |
| R8 | −32.895 | d8 = | 0.426 | | | |
| R9 | 10.201 | d9 = | 0.495 | nd5 | 1.5444 | v5 | 55.82 |
| R10 | 43.481 | d10 = | 0.438 | | | |
| R11 | −6.143 | d11 = | 0.237 | nd6 | 1.6400 | v6 | 23.54 |
| R12 | −13.644 | d12 = | 0.033 | | | |
| R13 | 4.164 | d13 = | 0.436 | nd7 | 1.5444 | v7 | 55.82 |
| R14 | 5.125 | d14 = | 0.250 | | | |
| R15 | 7.734 | d15 = | 1.493 | nd8 | 1.5444 | v8 | 55.82 |
| R16 | 9.242 | d16 = | 0.340 | | | |
| R17 | 2.494 | d17 = | 0.514 | nd9 | 1.5346 | v9 | 55.69 |
| R18 | 1.759 | d18 = | 0.700 | | | |
| R19 | ∞ | d19 = | 0.110 | ndg | 1.5168 | vg | 64.17 |
| R20 | ∞ | d20 = | 0.161 | | | |

Table 6 shows aspherical surface data of each lens in the camera optical lens 20 according to Embodiment 2 of the present invention.

TABLE 6

| | Conic coefficient | Aspherical surface coefficient | | | | |
|---|---|---|---|---|---|---|
| | k | A4 | A6 | A8 | A10 | A12 |
| R1 | 8.5368E−02 | 1.0867E−03 | −9.3703E−04 | 4.0530E−04 | −1.6381E−04 | 6.5852E−06 |
| R2 | −3.4472E+01 | −1.9525E−02 | 8.7309E−03 | −2.9444E−03 | 5.5804E−04 | −6.1027E−05 |
| R3 | −1.6355E+01 | −2.8900E−02 | 1.2502E−02 | −2.8547E−03 | 5.1984E−04 | −5.4073E−05 |
| R4 | −1.3077E+01 | 3.8128E−03 | −1.3402E−03 | 2.2709E−03 | −9.3120E−04 | 1.8424E−04 |
| R5 | −1.6073E+01 | 2.2979E−02 | −4.9153E−03 | 9.0544E−04 | −9.7642E−05 | −9.6767E−06 |
| R6 | 9.6067E+00 | −5.4116E−03 | 1.4754E−03 | −7.0864E−04 | 4.5396E−06 | −1.4691E−05 |
| R7 | −7.4927E+01 | −1.0753E−02 | −1.0790E−03 | 4.5505E−04 | −1.9696E−04 | −1.4180E−06 |
| R8 | −5.4815E+02 | −1.4195E−02 | 4.2315E−04 | −9.8153E−05 | 1.8043E−05 | 2.3642E−06 |

TABLE 6-continued

| | | | | | |
|---|---|---|---|---|---|
| R9 | −1.3069E+02 | −1.3249E−03 | −2.3515E−03 | 5.9956E−05 | 2.3226E−05 | −1.1612E−07 |
| R10 | −5.3945E+03 | −1.5493E−02 | 3.3862E−03 | −8.1780E−04 | −1.7561E−04 | 1.0429E−04 |
| R11 | 4.3393E+00 | −6.2617E−04 | 5.8340E−03 | −2.7843E−03 | 5.5012E−04 | −5.5468E−05 |
| R12 | 1.5417E+01 | −9.1385E−03 | 5.4768E−03 | −1.9215E−03 | 3.1751E−04 | −2.6871E−05 |
| R13 | −6.6764E+00 | −1.3203E−02 | 1.7491E−03 | −5.4205E−04 | 6.6339E−05 | −6.0708E−06 |
| R14 | −1.6508E+00 | −1.0150E−02 | 8.2962E−04 | −1.6108E−04 | 1.5120E−05 | −6.0001E−07 |
| R15 | −1.6508E+00 | −1.2367E−02 | 1.1642E−03 | −1.5574E−04 | 1.4681E−05 | −6.2916E−07 |
| R16 | −1.6508E+00 | −6.4843E−03 | 9.5673E−04 | −1.5976E−04 | 1.4818E−05 | −6.1904E−07 |
| R17 | −6.7309E+00 | −3.7023E−02 | 4.9745E−03 | −3.6396E−04 | 1.9322E−05 | −7.6608E−07 |
| R18 | −4.1134E+00 | −2.4201E−02 | 4.1261E−03 | −4.6488E−04 | 3.2984E−05 | −1.3965E−06 |

| | Conic coefficient | Aspherical surface coefficient | | | |
|---|---|---|---|---|---|
| | k | A14 | A16 | A18 | A20 |
| R1 | 8.5368E−02 | −1.9027E−07 | 1.5686E−07 | −7.3387E−08 | −2.3035E−08 |
| R2 | −3.4472E+01 | −1.7806E−06 | 5.1100E−07 | 3.2364E−07 | −9.6476E−08 |
| R3 | −1.6355E+01 | 6.2606E−06 | 1.6416E−09 | 3.0037E−07 | −1.3952E−07 |
| R4 | −1.3077E+01 | 1.6176E−05 | −2.8625E−06 | −7.3983E−07 | −6.5328E−08 |
| R5 | −1.6073E+01 | 9.6054E−06 | 1.7294E−06 | 3.0329E−07 | −2.3334E−07 |
| R6 | 9.6067E+00 | −5.1195E−06 | 1.4715E−06 | 1.6623E−07 | −8.5310E−08 |
| R7 | −7.4927E+01 | 6.8760E−06 | −3.7190E−07 | −3.8648E−07 | 5.4717E−09 |
| R8 | −5.4815E+02 | −7.5366E−08 | −9.7901E−08 | 8.7480E−09 | 2.9026E−09 |
| R9 | −1.3069E+02 | −4.0066E−08 | −2.1178E−08 | 3.5869E−10 | 5.6342E−10 |
| R10 | −5.3945E+03 | −1.6183E−05 | 8.0220E−07 | 1.5132E−09 | 6.2064E−10 |
| R11 | 4.3393E+00 | 2.4392E−06 | −8.3426E−09 | −2.6842E−09 | −1.4529E−09 |
| R12 | 1.5417E+01 | 9.0084E−07 | −3.7379E−09 | 4.7712E−10 | 9.9752E−11 |
| R13 | −6.6764E+00 | 2.2550E−07 | 5.0464E−09 | 3.2074E−10 | 2.3728E−12 |
| R14 | −1.6508E+00 | 7.9758E−09 | 8.8495E−11 | −2.4489E−13 | −1.0323E−13 |
| R15 | −1.6508E+00 | 6.8151E−09 | 6.6285E−11 | 1.7285E−12 | 9.4783E−14 |
| R16 | −1.6508E+00 | 7.3258E−09 | 8.5674E−11 | 5.7277E−13 | −4.5573E−14 |
| R17 | −6.7309E+00 | 1.8382E−08 | −2.0525E−10 | 2.7646E−13 | 1.3430E−14 |
| R18 | −4.1134E+00 | 3.2499E−08 | −3.2856E−10 | −2.8408E−13 | 1.8439E−14 |

Design data of the inflection point and the arrest point of each lens in the camera optical lens 20 according to Embodiment 2 of the present invention are shown in Tables 7 and 8.

TABLE 7

| | Number of inflexion points | Inflexion point position 1 | Inflexion point position 2 | Inflexion point position 3 | Inflexion point position 4 |
|---|---|---|---|---|---|
| P1R1 | 1 | 1.625 | / | / | / |
| P1R2 | 1 | 0.765 | / | / | / |
| P2R1 | 0 | / | / | / | / |
| P2R2 | 0 | / | / | / | / |
| P3R1 | 0 | / | / | / | / |
| P3R2 | 1 | 1.465 | / | / | / |
| P4R1 | 0 | / | / | / | / |
| P4R2 | 1 | 2.025 | / | / | / |
| P5R1 | 2 | 0.815 | 2.295 | / | / |
| P5R2 | 1 | 0.305 | / | / | / |
| P6R1 | 0 | / | / | / | / |
| P6R2 | 1 | 2.655 | / | / | / |
| P7R1 | 2 | 1.075 | 2.845 | / | / |
| P7R2 | 2 | 1.365 | 3.445 | / | / |
| P8R1 | 1 | 1.035 | / | / | / |
| P8R2 | 2 | 1.535 | 4.725 | / | / |
| P9R1 | 4 | 0.765 | 2.555 | 3.595 | 4.815 |
| P9R2 | 1 | 1.025 | / | / | / |

TABLE 8

| | Number of arrest points | Arrest point position 1 |
|---|---|---|
| P1R1 | 0 | / |
| P1R2 | 1 | 1.465 |
| P2R1 | 0 | / |
| P2R2 | 0 | / |
| P3R1 | 0 | / |
| P3R2 | 0 | / |
| P4R1 | 0 | / |
| P4R2 | 0 | / |
| P5R1 | 1 | 1.365 |
| P5R2 | 1 | 0.545 |
| P6R1 | 0 | / |
| P6R2 | 0 | / |
| P7R1 | 1 | 1.835 |
| P7R2 | 1 | 2.355 |
| P8R1 | 1 | 1.915 |
| P8R2 | 1 | 2.965 |
| P9R1 | 1 | 1.575 |
| P9R2 | 1 | 2.895 |

Figure 6:
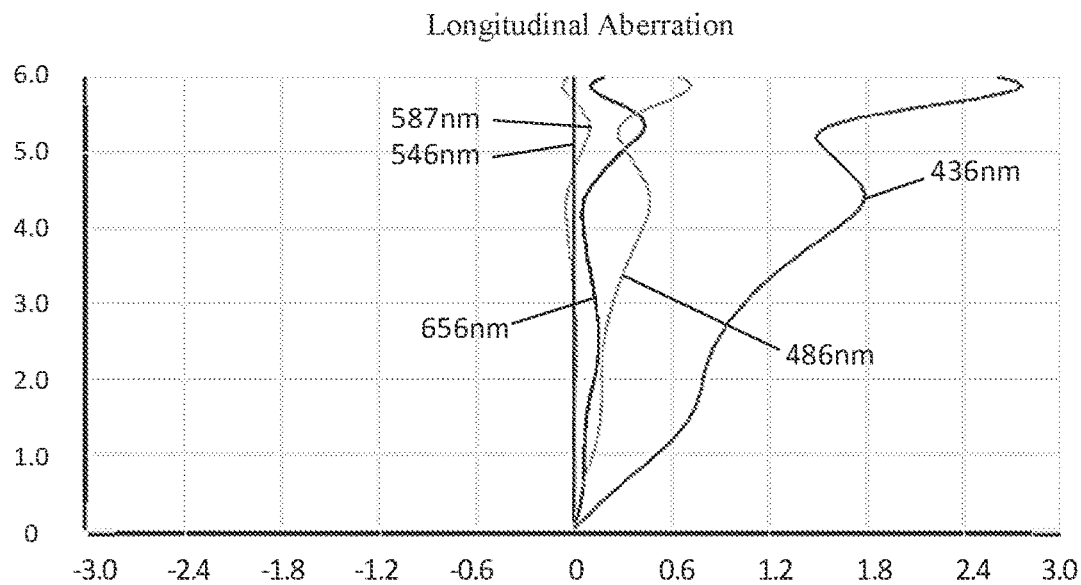
FIG. 6 is a schematic diagram of a longitudinal aberration of the camera optical lens shown in FIG. 5.
Figure 7:
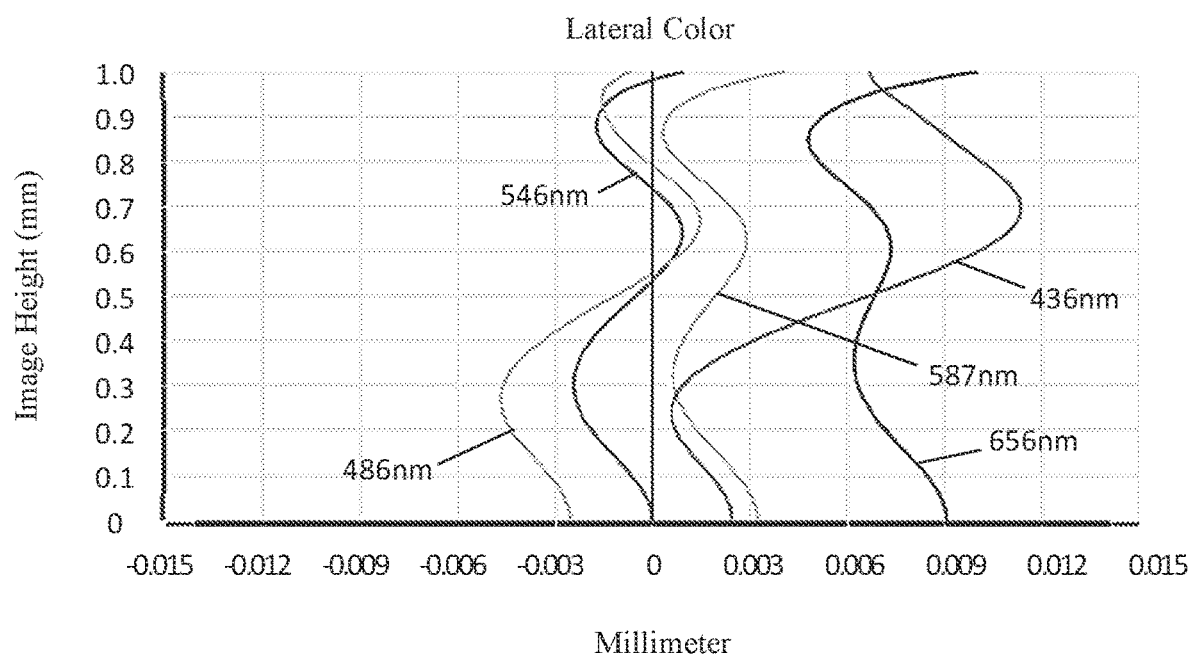
FIG. 7 is a schematic diagram of a lateral color of the camera optical lens shown in FIG. 5.
Figure 8:
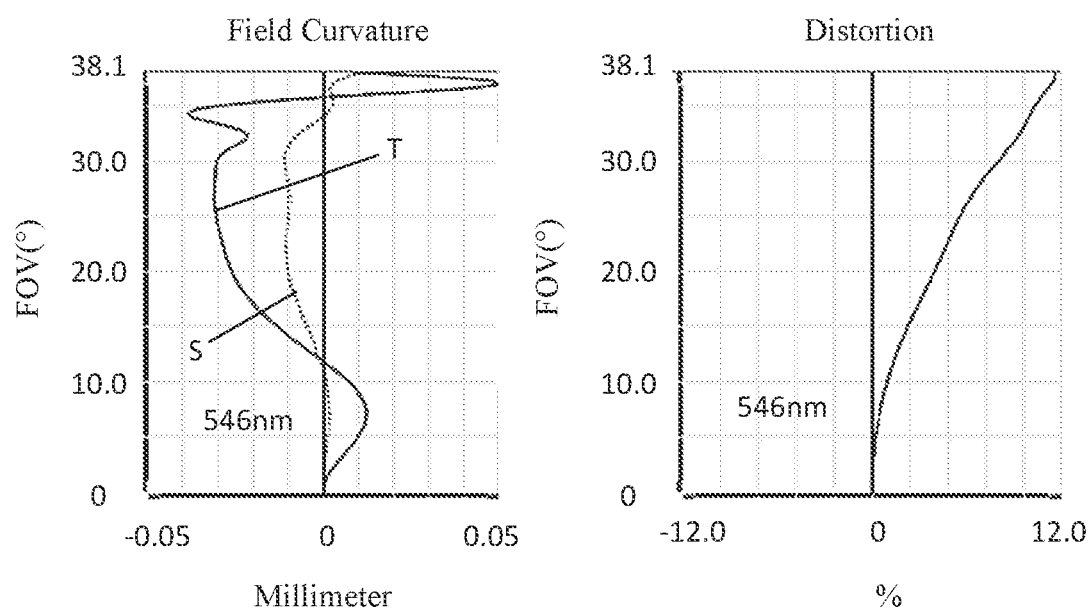
FIG. 8 is a schematic diagram of a field curvature and a distortion of the camera optical lens shown in FIG. 5.

FIG. 6 and FIG. 7 are schematic diagrams of a longitudinal aberration and a lateral color of the camera optical lens 20 after light having a wavelength of 656 nm, 587 nm, 546 nm, 486 nm, and 436 nm passes through the camera optical lens 20 according to Embodiment 2, respectively. FIG. 8 is a schematic diagram of a field curvature and a distortion after light having a wavelength of 546 nm passes through the camera optical lens 20 according to Embodiment 2. The field curvature S in FIG. 8 is a field curvature in a sagittal direction, and T is a field curvature in a meridional direction.

As shown in Table 13, Embodiment 2 satisfies various conditions.

In this embodiment, an entrance pupil diameter ENPD of the camera optical lens 20 is 3.429 mm, a full-field image height IH is 6.000 mm, and a field of view FOV in a diagonal direction is 76.20°. The camera optical lens 20 satisfies design requirements for large aperture, wide angle, and ultra-thinness. The on-axis and off-axis chromatic aberrations are fully corrected, thereby achieving excellent optical performances.

Embodiment 3

Embodiment 3 is basically the same as Embodiment 1, and involves symbols having the same meanings as Embodiment 1, and only differences therebetween are listed below.

Figure 9:
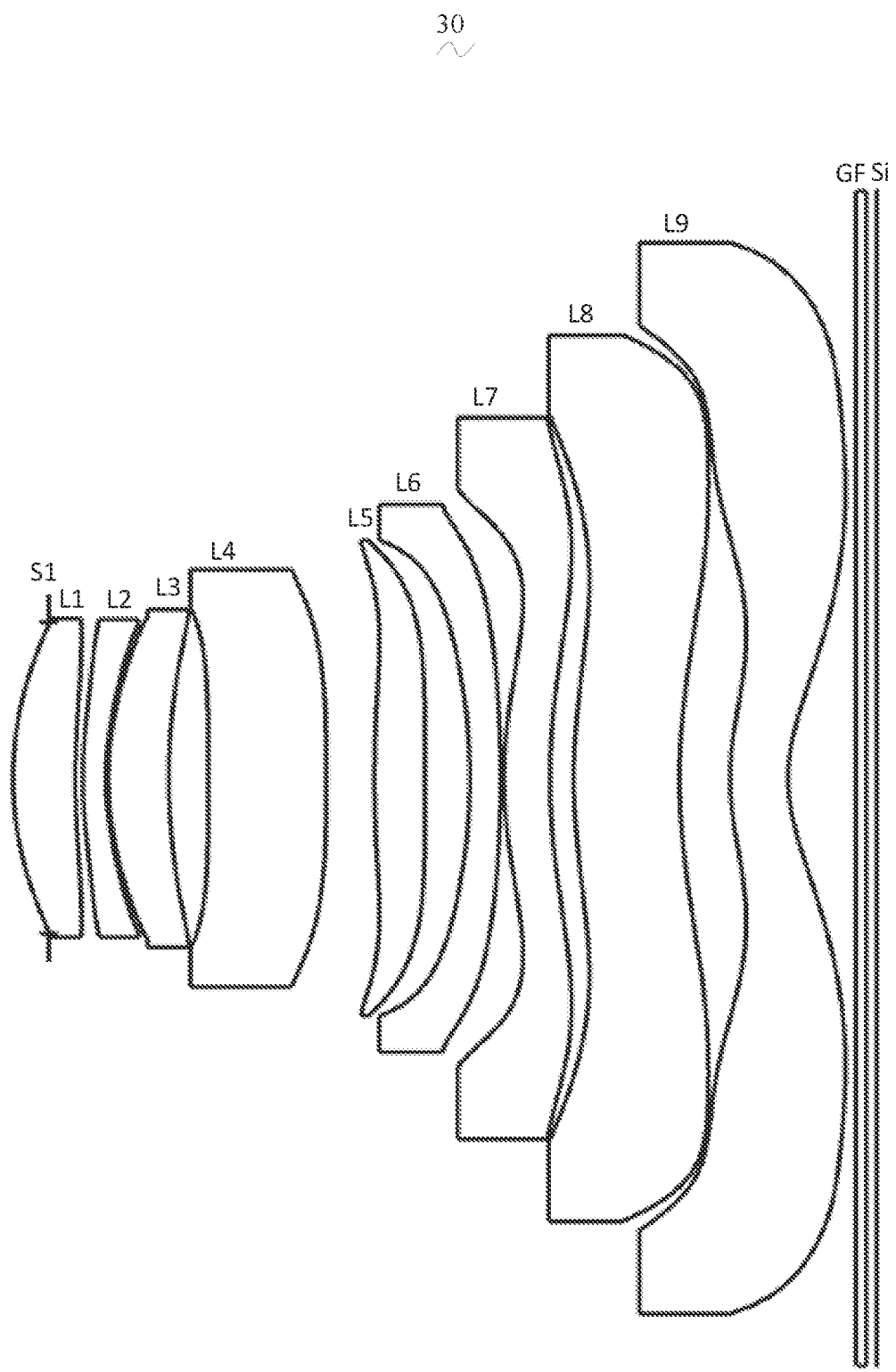
FIG. 9 is a structural schematic diagram of a camera optical lens according to Embodiment 3 of the present invention.

FIG. 9 shows a camera optical lens 30 according to Embodiment 3 of the present invention. The fourth lens L4 has positive refractive power, and the eighth lens L8 has positive refractive power.

Design data of the camera optical lens 30 of Embodiment 3 of the present invention are shown in Tables 9 and 10.

TABLE 9

| | R | d | | nd | | vd | |
|---|---|---|---|---|---|---|---|
| S1 | ∞ | d0 = | −0.370 | | | | |
| R1 | 3.621 | d1 = | 0.645 | nd1 | 0.0000 | v1 | 55.82 |
| R2 | 7.731 | d2 = | 0.077 | | | | |
| R3 | 4.486 | d3 = | 0.237 | nd2 | 0.0000 | v2 | 23.54 |
| R4 | 2.957 | d4 = | 0.028 | | | | |
| R5 | 3.188 | d5 = | 0.625 | nd3 | 0.0000 | v3 | 55.82 |
| R6 | 6.849 | d6 = | 0.411 | | | | |
| R7 | −60.783 | d7 = | 1.218 | nd4 | 0.0000 | v4 | 55.82 |
| R8 | −26.689 | d8 = | 0.496 | | | | |
| R9 | 10.217 | d9 = | 0.523 | nd5 | 0.0000 | v5 | 55.82 |
| R10 | 85.515 | d10 = | 0.464 | | | | |
| R11 | −6.155 | d11 = | 0.319 | nd6 | 0.0000 | v6 | 23.54 |
| R12 | −14.820 | d12 = | 0.033 | | | | |
| R13 | 4.393 | d13 = | 0.475 | nd7 | 0.0000 | v7 | 55.82 |
| R14 | 6.138 | d14 = | 0.249 | | | | |
| R15 | 6.120 | d15 = | 1.093 | nd8 | 0.0000 | v8 | 55.82 |
| R16 | 6.522 | d16 = | 0.522 | | | | |
| R17 | 2.670 | d17 = | 0.601 | nd9 | 0.0000 | v9 | 55.69 |
| R18 | 1.788 | d18 = | 0.700 | | | | |
| R19 | ∞ | d19 = | 0.110 | ndg | 0.0000 | vg | 64.17 |
| R20 | ∞ | d20 = | 0.107 | | | | |

Table 10 shows aspherical surface data of each lens in the camera optical lens 30 of Embodiment 3 of the present invention.

TABLE 10

| | Conic coefficient | Aspherical surface coefficient | | | | |
|---|---|---|---|---|---|---|
| | k | A4 | A6 | A8 | A10 | A12 |
| R1 | 5.0773E−02 | 9.0217E−04 | −9.2850E−04 | 3.9129E−04 | −1.7099E−04 | 4.8620E−06 |
| R2 | −3.5235E+01 | −1.9478E−02 | 8.7014E−03 | −2.9705E−03 | 5.5089E−04 | −6.2207E−05 |
| R3 | −1.6337E+01 | −2.9033E−02 | 1.2529E−02 | −2.8325E−03 | 5.2350E−04 | −5.4420E−05 |
| R4 | −1.3464E+01 | 3.8309E−03 | −1.3502E−03 | 2.2646E−03 | −9.3260E−04 | 1.8358E−04 |
| R5 | −1.5492E+01 | 2.2757E−02 | −5.0126E−03 | 8.8622E−04 | −1.0145E−04 | −1.1000E−05 |
| R6 | 9.6643E+00 | −5.3609E−03 | 1.5610E−03 | −6.8870E−04 | 5.3112E−06 | −1.5134E−05 |
| R7 | −7.5277E+01 | −1.0716E−02 | −1.1679E−03 | 4.5338E−04 | −1.9515E−04 | −1.4083E−06 |
| R8 | −4.2227E+02 | −1.4721E−02 | 3.0325E−04 | −1.1604E−04 | 1.6019E−05 | 2.2237E−06 |
| R9 | −1.1578E+02 | −3.4392E−04 | −2.3470E−03 | 5.6032E−05 | 2.2889E−05 | −1.3121E−07 |
| R10 | −1.9245E+04 | −1.6293E−02 | 3.3824E−03 | −8.1706E−04 | −1.7584E−04 | 1.0424E−04 |
| R11 | 4.3184E+00 | −4.0667E−02 | 5.8559E−03 | −2.7813E−03 | 5.5079E−04 | −5.5490E−05 |
| R12 | 1.2926E+01 | −8.6523E−03 | 5.4963E−03 | −1.9195E−03 | 3.1770E−04 | −2.6859E−05 |
| R13 | −5.7145E+00 | −1.2876E−02 | 1.7414E−03 | −5.3871E−04 | 6.6779E−05 | −6.0563E−06 |
| R14 | −1.2248E+00 | −9.0993E−03 | 8.5051E−04 | −1.6100E−04 | 1.5108E−05 | −6.0130E−07 |
| R15 | −1.2248E+00 | −1.3261E−02 | 1.1497E−03 | −1.5651E−04 | 1.4746E−05 | −6.2448E−07 |
| R16 | −1.2248E+00 | −7.4203E−03 | 9.1236E−04 | −1.5791E−04 | 1.4890E−05 | −6.1893E−07 |
| R17 | −7.2829E+00 | −3.7351E−02 | 5.0037E−03 | −3.6477E−04 | 1.9288E−05 | −7.6573E−07 |
| R18 | −4.1104E+00 | −2.3636E−02 | 4.0981E−03 | −4.6474E−04 | 3.3006E−05 | −1.3963E−06 |

| | Conic coefficient | Aspherical surface coefficient | | | | |
|---|---|---|---|---|---|---|
| | k | A14 | A16 | A18 | A20 | |
| R1 | 5.0773E−02 | −4.2364E−07 | 1.4481E−07 | −8.1292E−08 | −3.4596E−08 | |
| R2 | −3.5235E+01 | −1.8852E−06 | 5.0391E−07 | 3.0432E−07 | −1.0910E−07 | |
| R3 | −1.6337E+01 | 5.9292E−06 | −7.2662E−08 | 2.9768E−07 | −1.4430E−07 | |
| R4 | −1.3464E+01 | 1.5889E−05 | −2.9557E−06 | −7.5614E−07 | −6.1250E−08 | |
| R5 | −1.5492E+01 | 9.1013E−06 | 1.5768E−06 | 2.9035E−07 | −2.0933E−07 | |
| R6 | 9.6643E+00 | −5.2095E−06 | 1.4826E−06 | 1.7830E−07 | −8.2053E−08 | |
| R7 | −7.5277E+01 | 6.6749E−06 | −4.8905E−07 | −3.3457E−07 | 9.9801E−09 | |
| R8 | −4.2227E+02 | −6.7902E−08 | −9.3127E−08 | 9.7682E−09 | 3.0587E−09 | |
| R9 | −1.1578E+02 | −4.0559E−08 | −2.1326E−08 | 3.1687E−10 | 5.5469E−10 | |
| R10 | −1.9245E+04 | −1.6186E−05 | 8.0257E−07 | 1.7624E−09 | 6.9120E−10 | |
| R11 | 4.3184E+00 | 2.4203E−06 | −1.0328E−08 | −2.4708E−09 | −1.3280E−09 | |
| R12 | 1.2926E+01 | 9.0023E−07 | −4.1004E−09 | 4.0170E−10 | 8.7521E−11 | |
| R13 | −5.7145E+00 | 2.2426E−07 | 4.8178E−09 | 3.0038E−10 | 1.1004E−12 | |
| R14 | −1.2248E+00 | 7.8758E−09 | 8.1943E−11 | −6.2036E−13 | −1.1978E−13 | |
| R15 | −1.2248E+00 | 6.9986E−09 | 6.9734E−11 | 1.4850E−12 | 5.7587E−14 | |
| R16 | −1.2248E+00 | 7.2518E−09 | 8.2505E−11 | 5.0474E−13 | −4.4974E−14 | |
| R17 | −7.2829E+00 | 1.8411E−08 | −2.0468E−10 | 2.7002E−13 | 1.2176E−14 | |
| R18 | −4.1104E+00 | 3.2486E−08 | −3.2915E−10 | −2.8857E−13 | 1.9122E−14 | |

Design data of the inflection point and the arrest point of each lens in the camera optical lens 30 according to Embodiment 3 of the present invention are shown in Tables 11 and 12.

TABLE 11

|  | Number of inflexion points | Inflexion point position 1 | Inflexion point position 2 | Inflexion point position 3 |
|---|---|---|---|---|
| P1R1 | 1 | 1.565 | / | / |
| P1R2 | 1 | 0.815 | / | / |
| P2R1 | 0 | / | / | / |
| P2R2 | 0 | / | / | / |
| P3R1 | 0 | / | / | / |
| P3R2 | 1 | 1.465 | / | / |
| P4R1 | 0 | / | / | / |
| P4R2 | 1 | 2.065 | / | / |
| P5R1 | 2 | 0.865 | 2.305 | / |
| P5R2 | 1 | 0.235 | / | / |
| P6R1 | 0 | / | / | / |
| P6R2 | 1 | 2.665 | / | / |
| P7R1 | 2 | 1.105 | 2.845 | / |
| P7R2 | 2 | 1.375 | 3.405 | / |
| P8R1 | 1 | 1.135 | / | / |
| P8R2 | 1 | 1.615 | / | / |
| P9R1 | 3 | 0.755 | 2.565 | 3.555 |
| P9R2 | 1 | 1.045 | / | / |

TABLE 12

|  | Number of arrest points | Arrest point position 1 |
|---|---|---|
| P1R1 | 0 | / |
| P1R2 | 1 | 1.505 |
| P2R1 | 0 | / |
| P2R2 | 0 | / |
| P3R1 | 0 | / |
| P3R2 | 0 | / |
| P4R1 | 0 | / |
| P4R2 | 0 | / |
| P5R1 | 1 | 1.435 |
| P5R2 | 1 | 0.395 |
| P6R1 | 0 | / |
| P6R2 | 0 | / |
| P7R1 | 1 | 1.865 |
| P7R2 | 1 | 2.385 |
| P8R1 | 1 | 2.085 |
| P8R2 | 1 | 3.095 |
| P9R1 | 1 | 1.515 |
| P9R2 | 1 | 3.035 |

Figure 10:
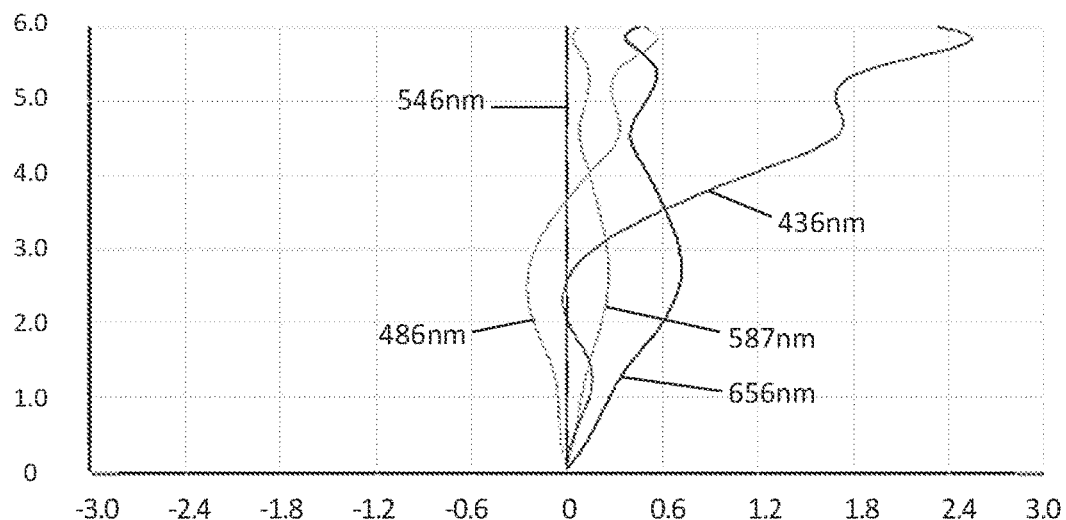
FIG. 10 is a schematic diagram of a longitudinal aberration of the camera optical lens shown in FIG. 9.
Figure 11:
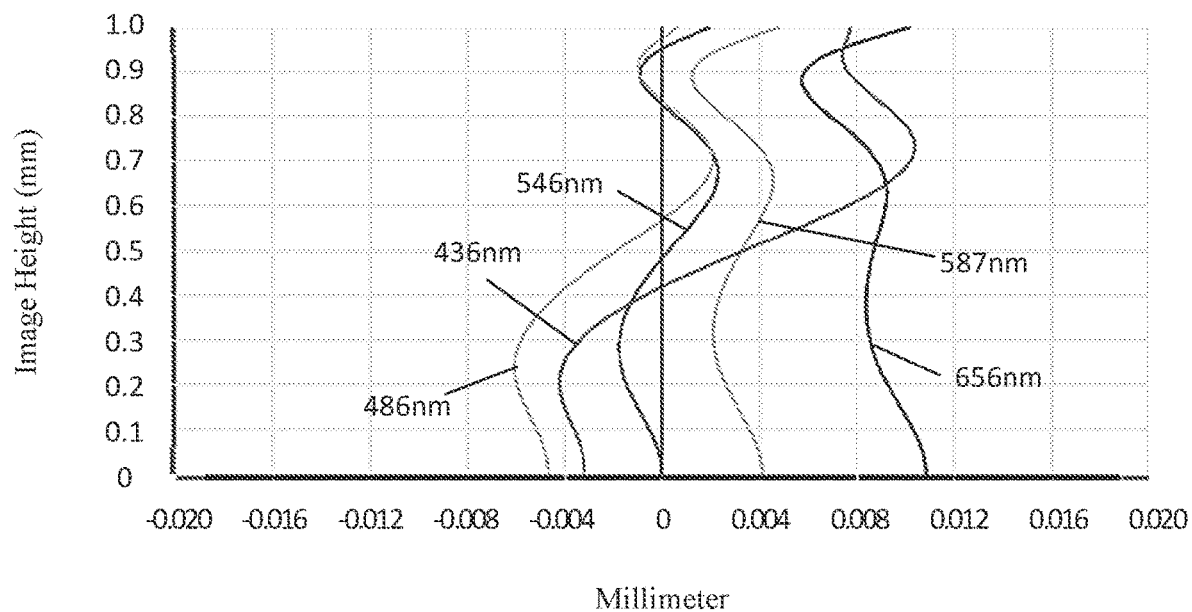
FIG. 11 is a schematic diagram of a lateral color of the camera optical lens shown in FIG. 9.
Figure 12:
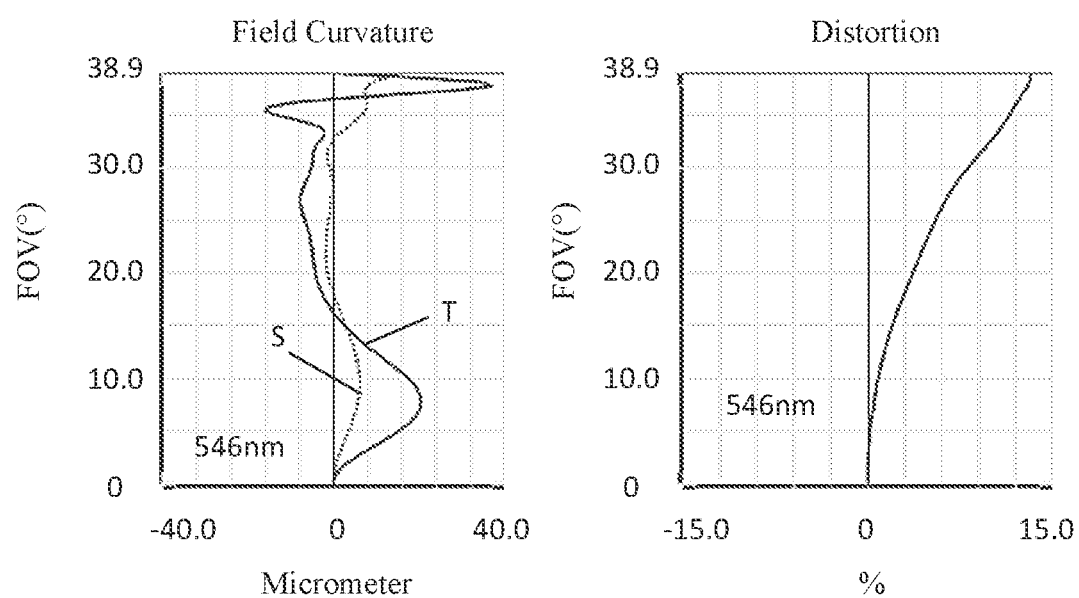
FIG. 12 is a schematic diagram of a field curvature and a distortion of the camera optical lens shown in FIG. 9.

FIG. 10 and FIG. 11 are schematic diagrams of a longitudinal aberration and a lateral color after light having a wavelength of 656 nm, 587 nm, 546 nm, 486 nm, and 436 nm passes through the camera optical lens 30 according to Embodiment 3. FIG. 12 is a schematic diagram of a field curvature and a distortion of the camera optical lens 30 after light having a wavelength of 546 nm passes through the camera optical lens 30 according to Embodiment 3. The field curvature S in FIG. 12 is a field curvature in a sagittal direction, and T is a field curvature in a meridional direction.

Table 13 below shows numerical values corresponding to each condition in this embodiment according to the above conditions. It is appreciated that, the camera optical lens 30 in this embodiment satisfies the above conditions.

In this embodiment, an entrance pupil diameter ENPD of the camera optical lens 30 is 3.281 mm, a full-field image height IH is 6.000 mm, and a field of view FOV in a diagonal direction is 77.80°. The camera optical lens 30 satisfies design requirements for large aperture, wide angle and ultra-thinness. The on-axis and off-axis chromatic aberrations are fully corrected, thereby achieving excellent optical performances.

TABLE 13

| Parameters and conditions | Embodiment 1 | Embodiment 2 | Embodiment 3 |
|---|---|---|---|
| f1/f | 0.96 | 1.35 | 1.80 |
| d15/d16 | 9.96 | 4.39 | 2.09 |
| f | 7.101 | 6.858 | 6.563 |
| f1 | 6.785 | 9.277 | 11.806 |
| f2 | −11.517 | −12.724 | −14.292 |
| f3 | 16.194 | 11.224 | 10.290 |
| f4 | −162.392 | 26536.919 | 85.943 |
| f5 | 51.484 | 24.251 | 21.171 |
| f6 | −21.764 | −17.506 | −16.524 |
| f7 | 21.498 | 35.008 | 25.786 |
| f8 | −73.700 | 64.233 | 92.642 |
| f9 | −18.880 | −14.684 | −13.247 |
| f12 | 13.384 | 25.491 | 44.915 |
| FNO | 2.00 | 2.00 | 2.00 |
| TTL | 9.201 | 9.099 | 8.933 |
| IH | 6.000 | 6.000 | 6.000 |
| FOV | 71.60° | 76.20° | 77.80° |

The above are only preferred embodiments of the present disclosure. Here, it should be noted that those skilled in the art may make modifications without departing from the inventive concept of the present disclosure, but these shall fall into the protection scope of the present disclosure.

What is claimed is:

1. A camera optical lens, comprising from an object side to an image side:
   a first lens;
   a second lens having negative refractive power;
   a third lens;
   a fourth lens;
   a fifth lens;
   a sixth lens;
   a seventh lens;
   an eighth lens; and
   a ninth lens,
   wherein the camera optical lens satisfies following conditions:

$0.70 \leq f1/f \leq 1.80$;

$-10.0 \leq (R13+R14)/(R13-R14) \leq -6.00$; and $2.00 \leq d15/d16 \leq 10.00$, where
   f denotes a focal length of the camera optical lens;
   f1 denotes a focal length of the first lens;
   R13 denotes a central curvature radius of an object side surface of the seventh lens;
   R14 denotes a central curvature radius of an image side surface of the seventh lens;
   d15 denotes an on-axis thickness of the eighth lens; and
   d16 denotes an on-axis distance from an image side surface of the eighth lens to an object side surface of the ninth lens.

2. The camera optical lens as described in claim 1, wherein the camera optical lens satisfies following conditions:

$-5.52 \leq (R1+R2)/(R1-R2) \leq -0.88$; and $0.04 \leq d1/TTL \leq 0.16$, where
R1 denotes a central curvature radius of an object side surface of the first lens;
R2 denotes a central curvature radius of an image side surface of the first lens;
d1 denotes an on-axis thickness of the first lens; and
TTL denotes a total optical length from the object side surface of the first lens to an image plane of the camera optical lens along an optic axis.

3. The camera optical lens as described in claim 1, wherein the camera optical lens satisfies following conditions:

$$-4.36 \leq f2/f \leq -1.08;$$

$$1.58 \leq (R3+R4)/(R3-R4) \leq 7.30; \text{ and}$$

$$0.01 \leq d3/TTL \leq 0.04,$$

where
f2 denotes a focal length of the second lens;
R3 denotes a central curvature radius of an object side surface of the second lens;
R4 denotes a central curvature radius of an image side surface of the second lens;
d3 denotes an on-axis thickness of the second lens; and
TTL denotes a total optical length from an object side surface of the first lens to an image plane of the camera optical lens along an optic axis.

4. The camera optical lens as described in claim 1, the camera optical lens satisfies following conditions:

$$0.78 \leq f3/f \leq 3.42;$$

$$-7.90 \leq (R5+R6)/(R5-R6) \leq -1.83; \text{ and}$$

$$0.03 \leq d5/TTL \leq 0.11,$$

where
f3 denotes a focal length of the third lens;
R5 denotes a central curvature radius of an object side surface of the third lens;
R6 denotes a central curvature radius of an image side surface of the third lens;
d5 denotes an on-axis thickness of the third lens; and
TTL denotes a total optical length from an object side surface of the first lens to an image plane of the camera optical lens along an optic axis.

5. The camera optical lens as described in claim 1, wherein the camera optical lens satisfies following conditions:

$$-45.74 \leq f4/f \leq 5804.23;$$

$$-349.82 \leq (R7+R8)/(R7-R8) \leq 3.85; \text{ and}$$

$$0.07 \leq d7/TTL \leq 0.22,$$

where
f4 denotes a focal length of the fourth lens;
R7 denotes a central curvature radius of an object side surface of the fourth lens;
R8 denotes a central curvature radius of an image side surface of the fourth lens;
d7 denotes an on-axis thickness of the fourth lens; and
TTL denotes a total optical length from an object side surface of the first lens to an image plane of the camera optical lens along an optic axis.

6. The camera optical lens as described in claim 1, wherein the camera optical lens satisfies following conditions:

$$1.61 \leq f5/f \leq 10.88;$$

$$-6.22 \leq (R9+R10)/(R9-R10) \leq -0.85; \text{ and}$$

$$0.03 \leq d9/TTL \leq 0.09,$$

where
f5 denotes a focal length of the fifth lens;
R9 denotes a central curvature radius of an object side surface of the fifth lens;
R10 denotes a central curvature radius of an image side surface of the fifth lens;
d9 denotes an on-axis thickness of the fifth lens; and
TTL denotes a total optical length from an object side surface of the first lens to an image plane of the camera optical lens along an optic axis.

7. The camera optical lens as described in claim 1, wherein the camera optical lens satisfies following conditions:

$$-6.13 \leq f6/f \leq -1.68;$$

$$-6.58 \leq (R11+R12)/(R11-R12) \leq -1.61; \text{ and}$$

$$0.01 \leq d11/TTL \leq 0.05,$$

where
f6 denotes a focal length of the sixth lens;
R11 denotes a central curvature radius of an object side surface of the sixth lens;
R12 denotes a central curvature radius of an image side surface of the sixth lens;
d11 denotes an on-axis thickness of the sixth lens; and
TTL denotes a total optical length from an object side surface of the first lens to an image plane of the camera optical lens along an optic axis.

8. The camera optical lens as described in claim 1, wherein the camera optical lens satisfies following conditions:

$$1.51 \leq f7/f \leq 7.66; \text{ and}$$

$$0.02 \leq d13/TTL \leq 0.08,$$

where
f7 denotes a focal length of the seventh lens;
d13 denotes an on-axis thickness of the seventh lens; and
TTL denotes a total optical length from an object side surface of the first lens to an image plane of the camera optical lens along an optic axis.

9. The camera optical lens as described in claim 1, wherein the camera optical lens satisfies following conditions:

$$-20.76 \leq f8/f \leq 21.17;$$

$$-62.90 \leq (R15+R16)/(R15-R16) \leq 6.24; \text{ and}$$

$$0.06 \leq d15/TTL \leq 0.25,$$

where
f8 denotes a focal length of the eighth lens;
R15 denotes a central curvature radius of an object side surface of the eighth lens;
R16 denotes a central curvature radius of the image side surface of the eighth lens; and
TTL denotes a total optical length from an object side surface of the first lens to an image plane of the camera optical lens along an optic axis.

10. The camera optical lens as described in claim 1, wherein the camera optical lens satisfies following conditions:

$-5.32 \leq f9/f \leq -1.35$;

$2.53 \leq (R17+R18)/(R17-R18) \leq 10.69$; and $0.03 \leq d17/TTL \leq 0.10$, where
f9 denotes a focal length of the ninth lens;
R17 denotes a central curvature radius of the object side surface of the ninth lens;
R18 denotes a central curvature radius of an image side surface of the ninth lens;
d17 denotes an on-axis thickness of the ninth lens; and
TTL denotes a total optical length from an object side surface of the first lens to an image plane of the camera optical lens along an optic axis.

* * * * *